(12) United States Patent
Kato

(10) Patent No.: US 9,732,823 B2
(45) Date of Patent: Aug. 15, 2017

(54) ELECTROMAGNETIC DAMPER

(71) Applicant: HONDA MOTOR CO., LTD., Tokyo (JP)

(72) Inventor: Takafumi Kato, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/789,394

(22) Filed: Jul. 1, 2015

(65) Prior Publication Data

US 2016/0001621 A1 Jan. 7, 2016

(30) Foreign Application Priority Data

Jul. 3, 2014 (JP) .................. 2014-137580

(51) Int. Cl.
| | |
|---|---|
| *B60G 13/14* | (2006.01) |
| *F16F 15/03* | (2006.01) |
| *B60G 13/02* | (2006.01) |
| *B60G 17/06* | (2006.01) |

(52) U.S. Cl.
CPC ............ *F16F 15/035* (2013.01); *B60G 13/02* (2013.01); *B60G 17/06* (2013.01); *F16F 15/03* (2013.01); *B60G 2202/20* (2013.01); *B60G 2202/422* (2013.01); *B60G 2202/424* (2013.01); *F16F 2232/06* (2013.01)

(58) Field of Classification Search
CPC ........ F16F 15/035; B60G 13/02; B60G 17/06
See application file for complete search history.

(56) References Cited

U.S. PATENT DOCUMENTS

| | | | | |
|---|---|---|---|---|
| 8,042,818 | B2* | 10/2011 | Yamawaki | B60G 17/06 188/266.1 |
| 8,191,874 | B2* | 6/2012 | Inoue | B60G 11/27 188/267 |
| 2004/0040798 | A1* | 3/2004 | Fujita | F16K 31/047 188/156 |
| 2009/0079145 | A1* | 3/2009 | Inoue | B60G 15/063 280/5.515 |
| 2009/0273147 | A1* | 11/2009 | Inoue | B60G 17/06 280/5.51 |
| 2012/0305347 | A1* | 12/2012 | Mori | B60G 17/08 188/266.2 |

FOREIGN PATENT DOCUMENTS

| | | | |
|---|---|---|---|
| JP | 2003-223220 | * | 8/2003 |
| JP | 2006-57668 A | | 3/2006 |

\* cited by examiner

*Primary Examiner* — Vishal Sahni
(74) *Attorney, Agent, or Firm* — Westerman, Hattori, Daniels & Adrian, LLP

(57) ABSTRACT

An electromagnetic damper is attached to a vehicle and causes oscillation damping force using a motor driven with energy from a power source. The electromagnetic damper includes an electrical circuit that causes a coil of the motor to be short-circuited in a state where the energy from the power source to the motor is interrupted.

10 Claims, 19 Drawing Sheets

AT TIME OF STOPPING

AT TIME OF STARTING OR ACCELERATION

AT TIME OF DECELERATION

14 — V SENSOR

120 — NOSE DISPLACEMENT AMOUNT SENSOR

DAMPER — 12b

ECU — 26b
- INPUT AND OUTPUT PART — 70
- OPERATION PART — 72
- CONTROL MANAGEMENT PART — 80
- REACTION FORCE CONTROL PART — 82
- SHORT-CIRCUIT CONTROL PART — 84b
- SWITCH CONTROL PART — 110
- RESISTANCE CONTROL PART — 112a
- STORAGE PART — 74

SHORT/OPEN-CIRCUIT SWITCHING CIRCUIT — 24a

INV — 22

BAT — 16

46, 48, 44, 44, 20, 42, 40, 30, 34, 32

ELECTROMAGNETIC DAMPER

CROSS REFERENCES TO RELATED APPLICATIONS

The present application claims priority under 35 U.S.C. §119 to Japanese Patent Application No. 2014-137580, filed Jul. 3, 2014, entitled "Electromagnetic Damper." The contents of this application are incorporated herein by reference in their entirety.

BACKGROUND

1. Field

The present application relates to an electromagnetic damper, which causes oscillation damping force using a motor driven with energy (an electrical power) from a power source.

Development of electromagnetic dampers has been promoted in recent years so as to increase ride comfort or operational stability of automobiles. Japanese Unexamined Patent Application Publication No. 2006-057668 discloses a shock absorber D including a movement conversion mechanism T, which converts a linear relative movement of a vehicle body B and an axle into rotary movement, and a motor M to which the rotary motion resulting from the conversion of the movement conversion mechanism T is transmitted (see Abstract).

Japanese Unexamined Patent Application Publication No. 2006-057668 mentions a case in which expansion and contraction of the shock absorber D are controlled by actively supplying current from an external power source to winding 7 of the motor M and adjusting rotational torque (see [0045]).

Typically, when a vehicle is stopped, the vehicle height or vehicle body position changes as the weight of a load changes due to getting on or off of an occupant, loading or unloading the vehicle, or the like. If even while the vehicle is stopped, power continues to be supplied to a motor from a power source, such as a battery, the accumulated power is consumed quickly. If while the vehicle is stopped, the power supply from the power source to the motor is stopped, it is difficult to damp the oscillation of the vehicle body using the electromagnetic damper, which depends on the change in the above-described vehicle height or vehicle body position.

In terms of the power consumption caused by the electromagnetic damper, the above-described disadvantages may occur not only at the times when the vehicle is stopped.

SUMMARY

The present application has been made by taking the above-described points into account and describes an electromagnetic damper capable of saving energy while exerting oscillation damping characteristics.

An electromagnetic damper according to the present application is attached to a vehicle and causes oscillation damping force using a motor driven with energy from a power source, and includes an electrical circuit that causes a coil of the motor to be short-circuited in a state where the energy from the power source to the motor is interrupted.

According to the present application, when the energy from the power source to the motor is in an interrupted state, a coil of the motor is short-circuited. In this case, when torque is added to an output shaft of the motor as input torque, the motor functions as a power generator, and causes torque in the direction opposite the input torque or causes counter-electromotive force. As a result, it is possible to cause the oscillation damping force using the motor without using the energy from the power source.

When for example, energy supply from the power source to the motor is stopped while the vehicle is stopped, it is possible to suppress change in the vehicle height or vehicle body position, which is caused by change in the load due to getting on or off of an occupant, loading or unloading baggage, or the like while the vehicle is stopped.

When a coil is short-circuited as a result of interruption of the energy from the power source to the motor because of some anomaly, even if it is difficult to supply energy from the power source to the motor, oscillation damping force can be caused. Accordingly, it is possible to ensure ride comfort or operational stability even while anomaly is occurring.

The electrical circuit may cause the coil to be short-circuited when the vehicle is started. A nose of the vehicle tends to move upward when the vehicle is started. According to the present application, since a coil is short-circuited when the vehicle is started, it is possible to cause the oscillation damping force for the displacement of the nose without consuming the energy from the power source.

The electrical circuit may cause the coil to be short-circuited when the vehicle is decelerated. The nose of the vehicle tends to move downward when the vehicle is decelerated. According to the present application, since a coil is short-circuited when the vehicle is decelerated, it is possible to cause the oscillation damping force for the displacement of the nose without consuming the energy from the power source.

The electrical circuit may cause the coil to be short-circuited when a decelerated state of the vehicle continues after exceeding a predetermined time threshold value, when the vehicle is in the decelerated state while being in a state where a vehicle speed is below a predetermined vehicle speed threshold value, or when deceleration of the vehicle is larger than zero and falls below a predetermined deceleration threshold value. Accordingly, it is possible to select an occasion suitable for short-circuiting a coil from among times of deceleration.

The electromagnetic damper may further include a variable resistor in a closed circuit caused by short-circuiting the coil, where resistance of the variable resistor may be switched according to a state of the vehicle, which is related to the oscillation damping force. Accordingly, even while the coil is short-circuited, it is possible to change oscillation damping force by switching the resistance of the variable resistor. Thus, it is possible to generate the oscillation damping force more preferably when there is a short circuit.

In another aspect of the present invention, a method for controlling an electromagnetic damper attached to a vehicle includes determining whether or not a power is supplied from a power source to a coil of a motor configured to apply oscillation damping force to the damper, and short-circuiting the coil of the motor when the power is not supplied from the power source to the coil of the motor. The method may further include a step of interrupting the supply of the power from the power source to the motor if necessary. In this manner, the supply of the power to the motor may be interrupted and the coil of the motor may be short-circuited to save the electrical power in the vehicle when the vehicle is started or decelerated or when a state of the vehicle that requires the oscillation damping force is detected. The method according to the present invention may include additional steps for controlling the dumper in various ways and manners as described in this application.

BRIEF DESCRIPTION OF THE DRAWINGS

FIG. 14 is a schematic configuration diagram that simplifies and illustrates part of a vehicle including an electromagnetic damper according to a fifth embodiment of the present application.

DESCRIPTION OF THE PREFERRED EMBODIMENTS

A. First Embodiment

[A1. Configuration of Vehicle 10]
<A1-1. Overall Configuration of Vehicle 10>

Figure 1:
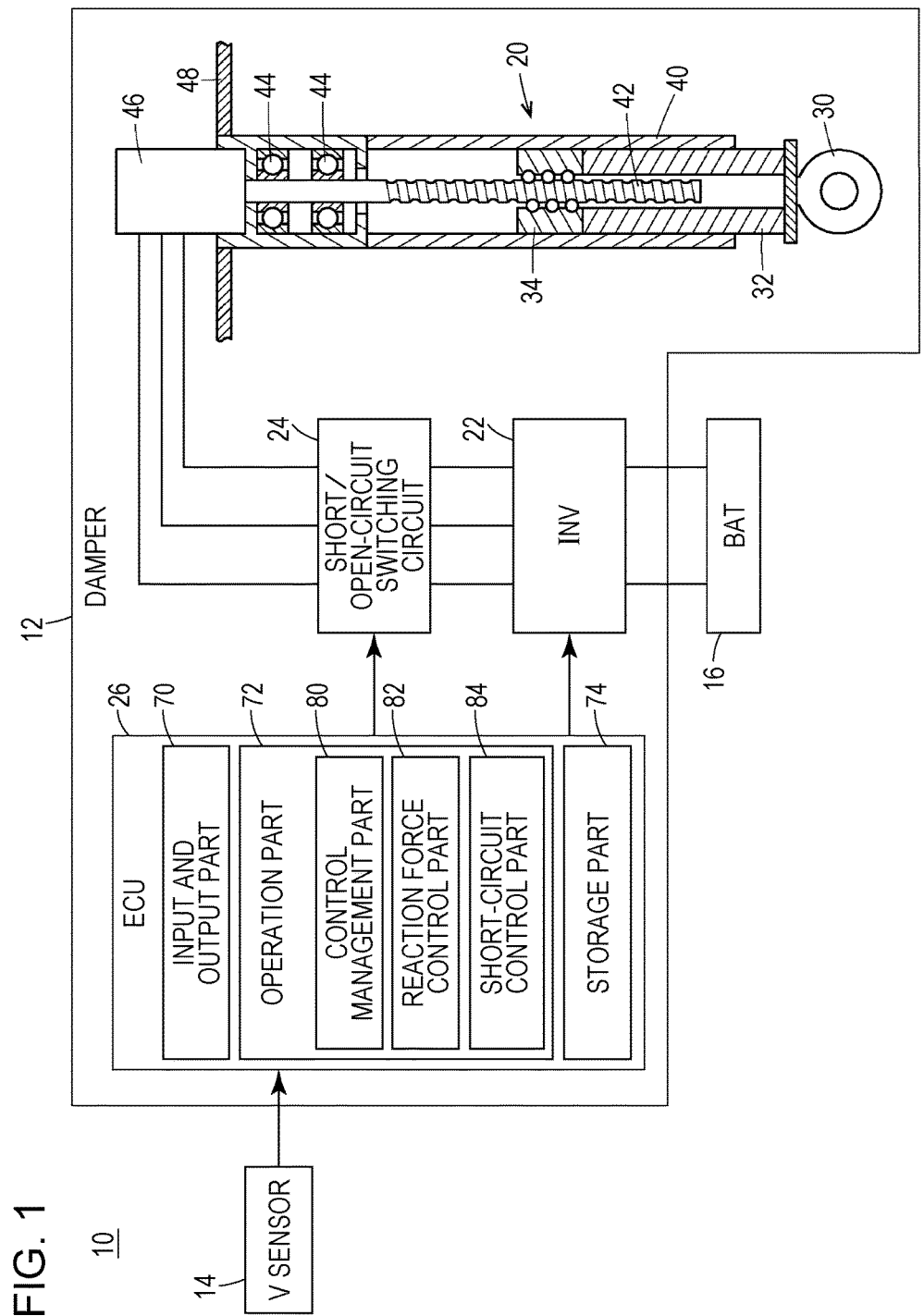
FIG. 1 is a schematic configuration diagram that simplifies and illustrates part of a vehicle including an electromagnetic damper according to a first embodiment of the present application.
Figure 2:
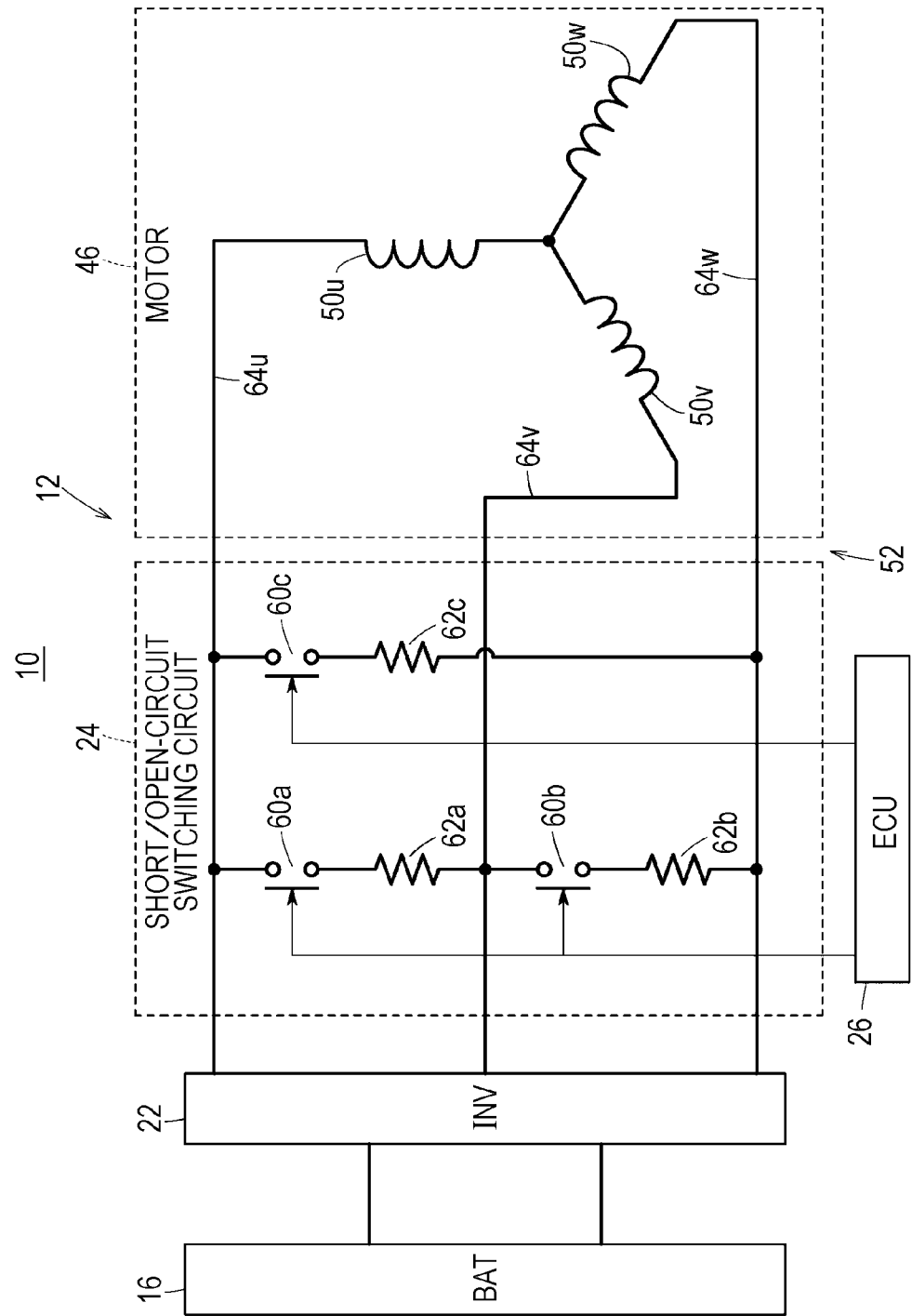
FIG. 2 is a circuit diagram that simplifies and illustrates part of the electromagnetic damper according to the first embodiment.

FIG. 1 is a schematic configuration diagram that simplifies and illustrates part of a vehicle 10 including an electromagnetic damper 12 according to a first embodiment of the present application, which is also referred to as the "damper 12" hereinafter. FIG. 2 is a circuit diagram that simplifies and illustrates part of the electromagnetic damper 12 according to the first embodiment. The damper 12 according to the first embodiment makes up part of a suspension unit of the vehicle 10. In addition to the damper 12, the vehicle 10 includes a vehicle speed sensor 14, which is indicated as "V SENSOR" in the drawings, and a battery 16, which is indicated as "BAT" in the drawings. The damper 12 are arranged both at front wheels (that is, a left front wheel and a right front wheel) and rear wheels (that is, a left rear wheel and a right rear wheel). As another example, the damper 12 may be arranged only at the front wheels or the rear wheels. The arrangement examples may be similarly applicable to the other embodiments.

The vehicle speed sensor 14 detects vehicle speed V [km/h] of the vehicle 10 and notifies the detected vehicle speed V to the damper 12, which is specifically an electronic control unit 26 described below. The battery 16 is for example, a lead storage battery, or may be another power source or an electrical accumulator unit, such as a lithium ion battery, a generator, a fuel cell, or a capacitor.

<A1-2. Damper 12>
<A1-2-1. Outline of Damper 12>

As illustrated in FIG. 1, the damper 12 includes a damper main body 20, an inverter 22, which is indicated as "INV" in the drawings, a short/open-circuit switching circuit 24, which is also referred to as the "switching circuit 24" hereinafter, and an electronic control unit 26, which is referred to as the "ECU 26" hereinafter.

<A1-2-2. Damper Main Body 20>
<A1-2-2-1. Outline of Damper Main Body 20>

Figure 3:
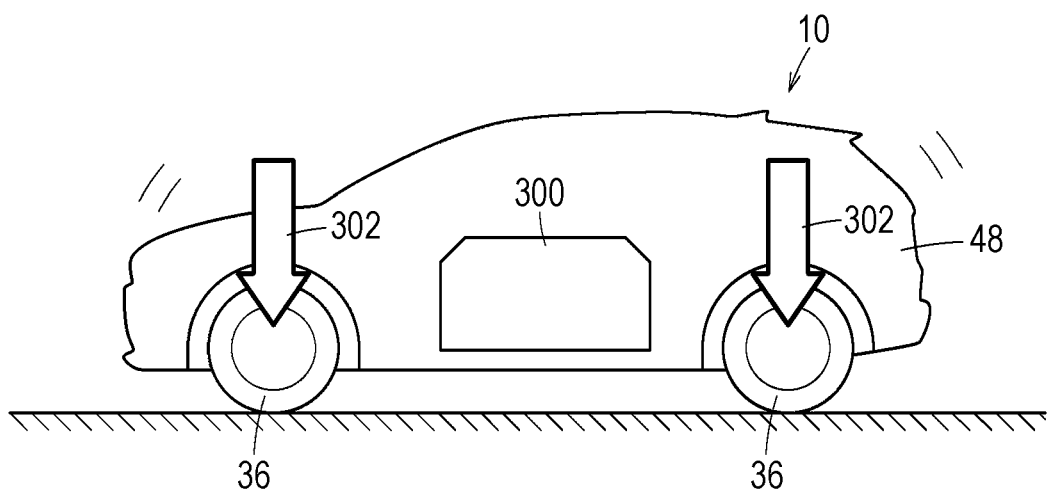
FIG. 3 illustrates how the vehicle height or vehicle body position changes as the weight of a load changes in stopping the vehicle.

As illustrated in FIG. 1, the damper main body 20 includes a connection part 30, an inner tube 32, and a nut 34 as members on the side of wheels 36 (see FIG. 3). The damper main body 20 further includes an outer tube 40, a screw shaft 42, bearings 44, and a motor 46 as members on the side of a vehicle body 48.

The connection part 30 is connected to the wheel 36 by being fixed to a knuckle of the suspension unit, which is not illustrated. When oscillation is input to the connection part 30 from the side of the wheel 36 and thrust force Fw is applied to the connection part 30 upward in FIG. 1 for example, the inner tube 32 and the nut 34 rise relative to the outer tube 40 and the screw shaft 42 rotates. At this time, it is possible to damp oscillation from the side of the wheel 36 toward the side of the vehicle body 48 by causing reaction force from the motor 46 to the screw shaft 42. As such, the damper main body 20 provided with the motor 46 configures a damping mechanism or system to convert the oscillation motion of the vehicle body relative to the wheel to the electrical power and vice versa, utilizing the motor 46 so as to damp the oscillation motion force in the controlled manner.

The motor 46 transmits motive force (the reaction force) to the screw shaft 42 in accordance with a command from the ECU 26.

Examples of a configuration usable for the damper main body 20 include an existing configuration, which is proposed in for example, Japanese Unexamined Patent Application Publication No. 2006-057668.

<A1-2-2-2. Motor 46>

The motor 46 is a three-phase alternating current (AC) brushless motor and as illustrated in FIG. 2, includes three coils 50u, 50v, and 50w, which are also referred to as the "motor coils 50u, 50v, and 50w" hereinafter. The motor 46 generates motive force (reaction force) to the screw shaft 42, which is based on the power supplied from the battery 16. The motor 46 may output the power generated by performing power production (regeneration) based on the force input from the side of the wheel 36 to the screw shaft 42 to the battery 16.

<A1-2-3. Inverter 22>

The inverter 22 is configured as a three-phase full bridge type and performs direct current (DC) to AC conversion to convert DC to three-phase AC and supply the resultant current to the motor 46. The inverter 22 may supply DC obtained after the AC/DC conversion accompanied by the regeneration operation to the battery 16.

<A1-2-4. Short/Open-Circuit Switching Circuit 24>

The switching circuit 24 selectively forms a closed circuit 52 (see FIG. 2) that includes the motor 46 in accordance with a command from the ECU 26 in a state where no power is supplied from the battery 16 via the inverter 22. As illustrated in FIG. 2, the switching circuit 24 includes switches 60a, 60b, and 60c that are turned on or off in accordance with a command from the ECU 26, and resistors (fixed resistors) 62a, 62b, and 62c with fixed resistance. The switch 60a is used for short-circuiting power lines 64u and 64v corresponding to the coils 50u and 50v. The switch 60b is used for short-circuiting the power line 64v and a power line 64w corresponding to the coils 50v and 50w. The switch 60c is used for short-circuiting the power lines 64u and 64w corresponding to the coils 50u and 50w.

<A1-2-5. ECU 26>

As illustrated in FIG. 1, the ECU 26 includes an input and output part 70, an operation part 72, and a storage part 74. The input and output part 70 performs input and output of signals along with the inverter 22, the switching circuit 24, or the like.

The operation part 72 controls each part of the damper 12 and includes a control management part 80, a reaction force control part 82, and a short-circuit control part 84. The control management part 80, the reaction force control part 82, and the short-circuit control part 84 are implemented by running a control program stored in the storage part 74.

The control management part 80 manages overall control performed by the ECU 26. The reaction force control part 82 performs motor reaction force control, which is described below. The short-circuit control part 84 controls a short-circuited state and an open state in the switching circuit 24.

The storage part 74 stores various kinds of programs or data used in the operation part 72, such as the control program.

[A2. Control in First Embodiment]

<A2-1. Basis>

FIG. 3 illustrates how the vehicle height or vehicle body position changes as the weight of a load changes in stopping the vehicle 10. Since a carried object 300 is present in the vehicle 10 in FIG. 3, the vehicle body 48 is lowered as a whole and arrows 302 indicate how the vehicle body 48 is lowered. While the vehicle 10 is stopped, the vehicle height or position of the vehicle body 48 changes as the weight of the load changes because of getting on or off of an occupant, loading or unloading the vehicle, or the like. Thus, in terms of oscillation suppression, it is preferable that the electromagnetic damper 12 causes oscillation damping force Fd, which is also referred to as the "damping force Fd" hereinafter.

In contrast, when power supply from the battery 16, which serves as the power source, to the motor 46 is continued even while the vehicle 10 is stopped, the speed of decrease in a state of charge (SOC) of the battery 16 rises. Thus, in terms of power consumption, it is preferable to stop the power supply from the battery 16 (the power source) to the motor 46 when the vehicle 10 is stopped.

The first embodiment attempts to save power while causing the oscillation damping force Fd by short-circuiting the coils 50u, 50v, and 50w when the vehicle 10 is stopped.

<A2-2. Specific Process>

Figure 4:
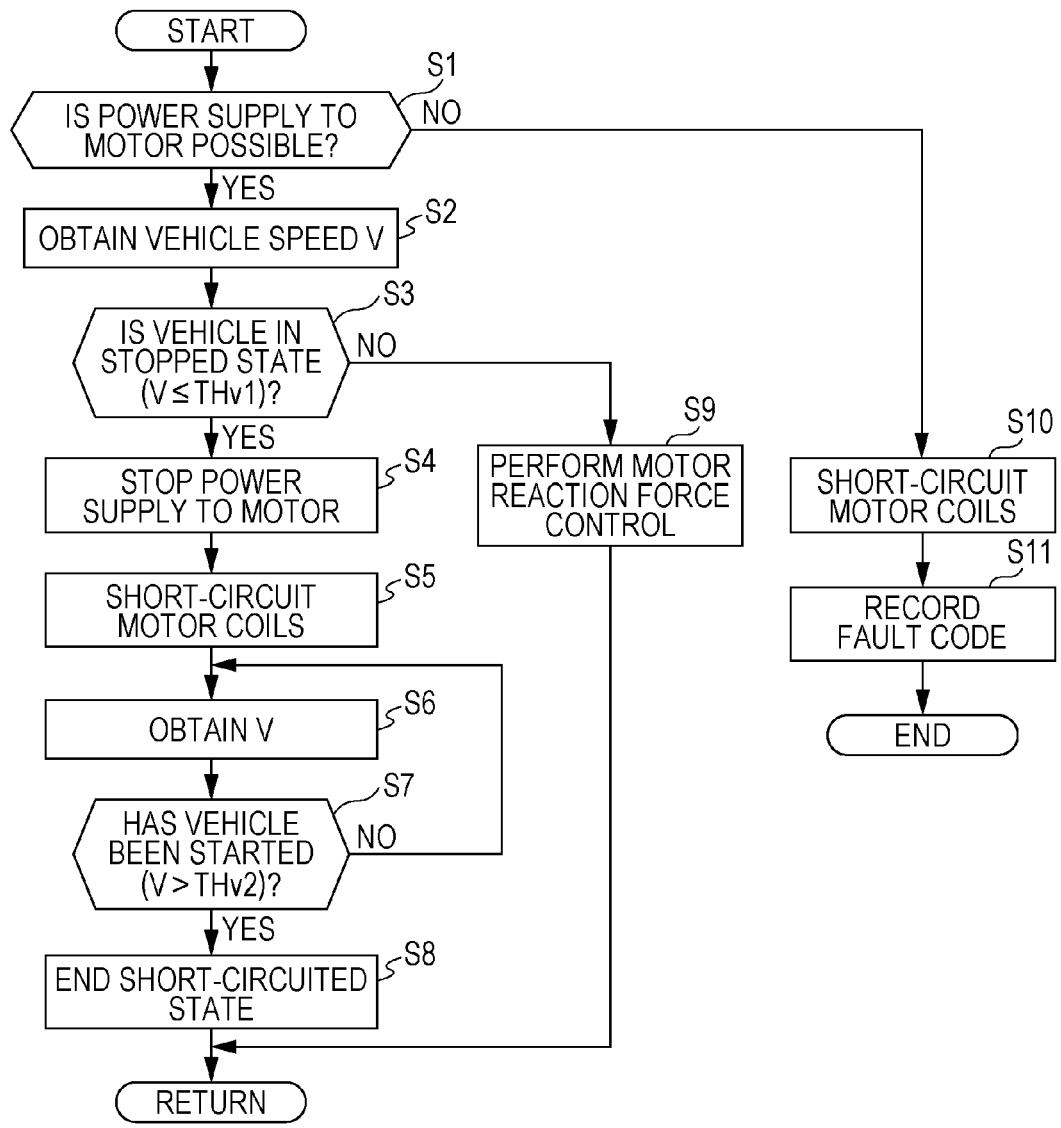
FIG. 4 is a flowchart that illustrates control of the electromagnetic damper according to the first embodiment.

FIG. 4 is a flowchart that illustrates control of the electromagnetic damper 12 according to the first embodiment. The control management part 80 of the ECU 26 performs steps S1 to S3, and S11 in FIG. 4. The reaction force control part 82 of the ECU 26 performs step S9. The short-circuit control part 84 performs steps S4 to S8, and S10.

In step S1 in FIG. 4, the ECU 26 determines whether or not the power supply from the battery 16 to the motor 46 is possible. The determination is based on for example, whether or not the SOC of the battery 16 is equal to or more than a predetermined SOC threshold value. As another example, the determination may be based on whether or not an open fault is occurring, which is a fault causing a contactor (not illustrated) between the battery 16 and the inverter 22 to remain open.

When the power supply to the motor 46 is possible (YES in step S1), in step S2, the ECU 26 obtains the vehicle speed V from the vehicle speed sensor 14.

In subsequent step S3, the ECU 26 determines whether or not the vehicle 10 is in the stopped state. Specifically, the ECU 26 determines whether or not the vehicle speed V is equal to or less than a first vehicle speed threshold value THv1, which is also referred to as the "threshold value THv1" hereinafter. The threshold value THv1 is a threshold value for determining whether or not the vehicle 10 is in the stopped state and may be for example, zero or a value near zero.

When the vehicle 10 is in the stopped state (YES in step S3), in step S4, the ECU 26 stops the power supply from the battery 16 to the motor 46. Specifically, the ECU 26 outputs no driving signal to each switching element of the inverter 22, which is not illustrated. Accordingly, no current flows from the battery 16 to the motor 46.

In step S5, the ECU 26 causes the motor coils 50u, 50v, and 50w to be short-circuited. Specifically, the ECU 26 outputs an ON signal Son to each of the switches 60a to 60c of the switching circuit 24. Accordingly, all of the switches 60a to 60c become closed and form the closed circuit 52 with the coils 50u, 50v, and 50w, the power lines 64u, 64v, and 64w, the switches 60a to 60c, and the like. The operation in step S5 is performed on all of the dampers 12. As another example, the operation in step S5 may be performed only on the dampers 12 of the front wheels or the rear wheels.

In step S6, the ECU 26 obtains the vehicle speed V from the vehicle speed sensor 14. In step S7, the ECU 26 determines whether or not the vehicle 10 has been started. Specifically, the ECU 26 determines whether or not the vehicle speed V has exceeded a second vehicle speed threshold value THv2, which is also referred to as the "threshold value THv2" hereinafter. The threshold value THv2 is a threshold value for determining whether or not the vehicle 10 has been started and may be for example, a value that is larger than the threshold value THv1 and is near zero. In a case where the vehicle 10 has not been started and remains in the stopped state (NO in step S7), the process returns to step S6. In a case where the vehicle 10 has been started (YES in step S7), the process proceeds to step S8.

In step S8, the ECU 26 causes the short-circuited state of the coils 50*u*, 50*v*, and 50*w* to end. Specifically, the ECU 26 stops outputting the ON signal Son to each of the switches 60*a* to 60*c*. Accordingly, each of the switches 60*a* to 60*c* becomes open and the closed circuit 52 is not established.

When the process returns to step S3 and the vehicle 10 is not in the stopped state (NO in step S3), in step S9, the ECU 26 performs motor reaction force control. For example, the ECU 26 controls output of the motor 46 or target current to the motor 46 according to lateral acceleration [m/s/s] detected by a lateral acceleration sensor, which is not illustrated, or a yaw rate [rad/s] detected by a yaw rate sensor, which is not illustrated. As another example, the output of the motor 46 may be controlled according to stroke speed Vd[mm/s] of the electromagnetic damper 12. As another example, the ECU 26 may perform feedback control on the motor 46 so that rotation speed [deg/s] of the screw shaft 42 is equal to or less than a predetermined threshold value (a rotation speed threshold value).

When the process returns to step S1 and the power supply from the battery 16 to the motor 46 is impossible (NO in step S1), similar to step S5, the ECU 26 causes the coils 50*u*, 50*v*, and 50*w* to be short-circuited in step S10. In subsequent step S11, the ECU 26 causes a fault code dependent on an anomaly symptom to be stored in the storage part 74. After step S11, the process in FIG. 4 is not resumed until the vehicle 10 is sent to be repaired and a predetermined process, such as resetting the fault code, is performed.

[A3. Advantages in First Embodiment]

According to the first embodiment described above, in the state where the energy from the battery 16 (the power source) to the motor 46 is interrupted, the coils 50*u*, 50*v*, and 50*w* of the motor are short-circuited (step S5 in FIG. 4). In this case, when torque is added to the output shaft of the motor 46 as input torque, the motor 46 functions as a power generator, and causes torque in the direction opposite the input torque or causes counter-electromotive force. As a result, it is possible to cause the oscillation damping force Fd using the motor 46 without using the energy from the battery 16.

When energy supply from the battery 16 to the motor 46 is stopped (step S4) while the vehicle is stopped (YES in step S3 in FIG. 4) as in the first embodiment, it is possible to suppress change in the height or position of the vehicle body 48, which is caused by change in the load due to getting on or off of an occupant, loading or unloading baggage, or the like while the vehicle is stopped.

When the coils 50*u*, 50*v*, and 50*w* are short-circuited (step S10) as a result of the interruption of the energy from the battery 16 to the motor 46 (NO in step S1 in FIG. 4) because of some anomaly, even if it is difficult to supply energy from the battery 16 to the motor 46, the oscillation damping force Fd can be caused. Accordingly, it is possible to ensure ride comfort or operational stability even while anomaly is occurring.

B. Second Embodiment

[B1. Configuration of Vehicle 10A (Comparison with First Embodiment)]

A hardware configuration according to a second embodiment is similar to that according to the first embodiment. Hereinafter, the same references are given to the same components and the detailed explanation on such components is omitted. The second embodiment is different from the first embodiment in the control performed by the ECU 26.

[B2. Control in Second Embodiment]

<B2-1. Basis>

Figure 5:
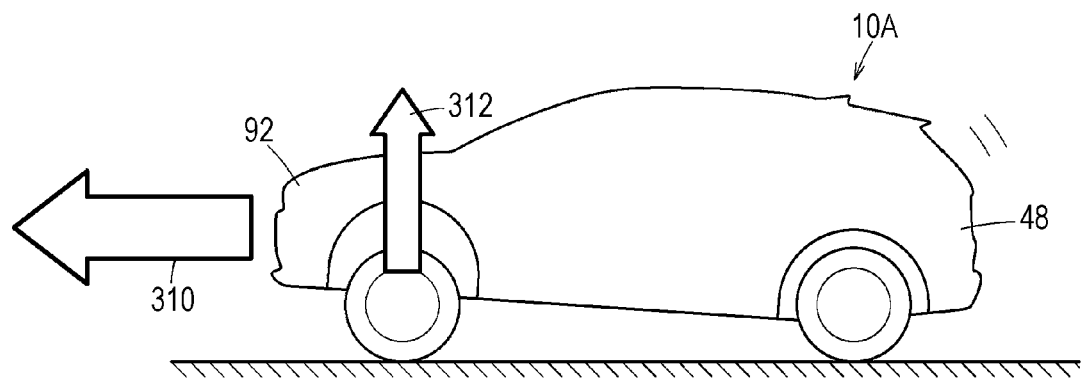
FIG. 5 illustrates how a nose of a vehicle body moves upward in starting or accelerating a vehicle according to a second embodiment of the present application.

FIG. 5 illustrates how a nose 92 of the vehicle body 48 moves upward in starting or accelerating a vehicle 10A according to the second embodiment. In the vehicle 10A in FIG. 5, the nose 92 is displaced upward because of the start or acceleration, and arrow 310 indicates how the vehicle 10A starts to travel while arrow 312 indicates how the nose 92 moves upward. In this manner, the nose 92 moves upward and then moves downward when the vehicle 10A is started or accelerated. Thus, it is preferable in terms of oscillation suppression that the electromagnetic damper 12 causes the oscillation damping force Fd.

In contrast, when the power supply from the battery 16 (the power source) to the motor 46 is continued even during the start or under acceleration, the speed of decrease in the SOC of the battery 16 rises. Thus, it is preferable in terms of power consumption to stop the power supply from the battery 16 (the power source) to the motor 46 when the vehicle 10A is started or accelerated.

The second embodiment attempts to save power while causing the oscillation damping force Fd by short-circuiting the coils 50*u*, 50*v*, and 50*w* when the vehicle 10A is started or accelerated.

<B2-2. Specific Process>

Figure 6:
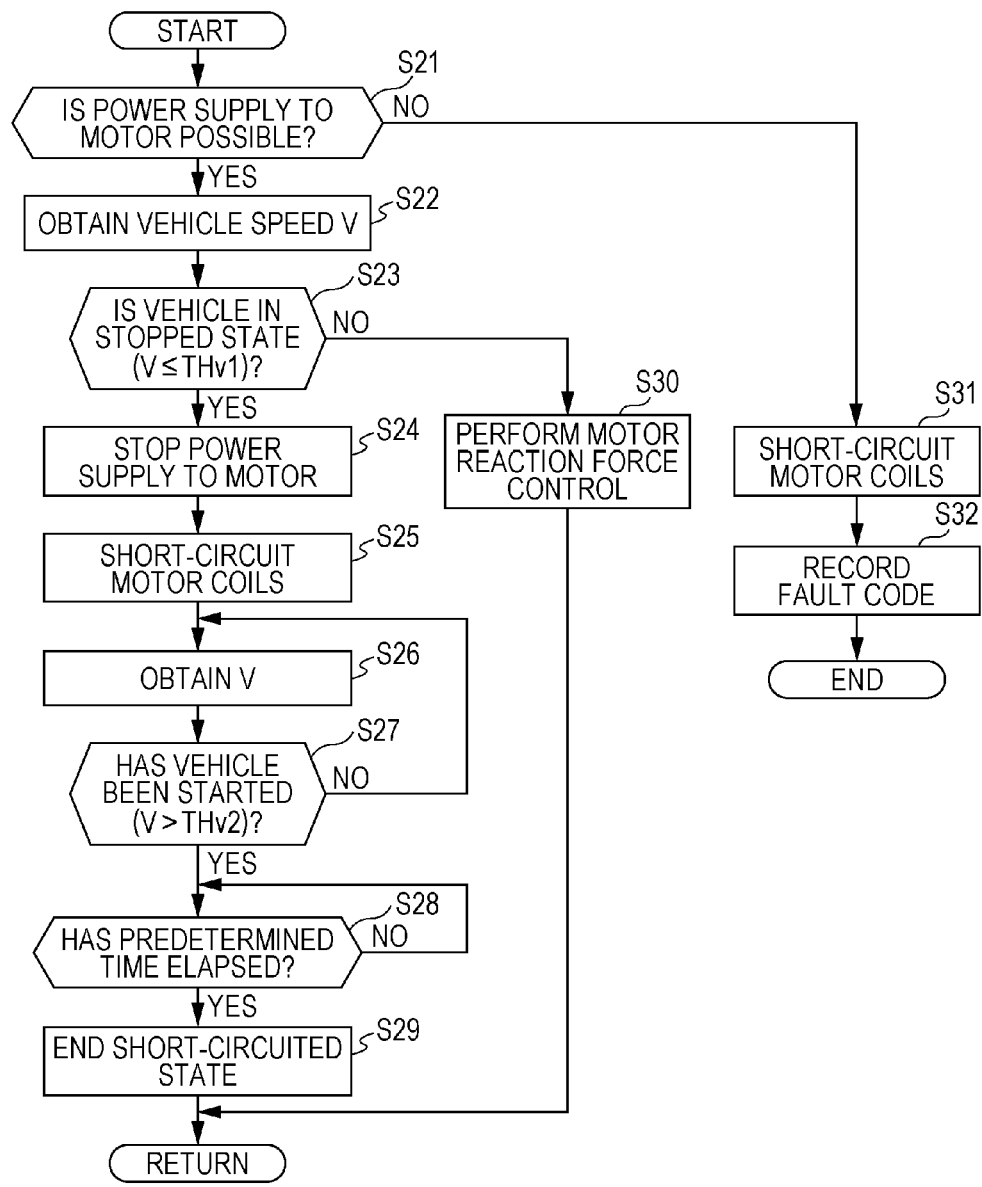
FIG. 6 is a flowchart that illustrates control of an electromagnetic damper according to the second embodiment.

FIG. 6 is a flowchart that illustrates control of the electromagnetic damper 12 according to the second embodiment. Steps S21 to S27 and steps S29 to S32 in FIG. 6 are the same as steps S1 to S7 and steps S8 to S11 in FIG. 4. Thus, when compared to FIG. 4, FIG. 6 is different from FIG. 4 in that FIG. 6 includes step S28. The control management part 80 of the ECU 26 performs steps S21 to S23 and step S32, which are included in steps S21 to S32 in FIG. 6. The reaction force control part 82 of the ECU 26 performs step S30. The short-circuit control part 84 performs steps S24 to S29 and step S31.

In a case where in step S27 in FIG. 6, the vehicle 10A has been started (YES in step S27), in step S28, the ECU 26 determines whether or not predetermined time Tx, which is also referred to as the "time Tx" hereinafter, has elapsed after the start of the vehicle 10A. For example, the time Tx is set as time during which the displacement of the nose 92 increases with the acceleration at the time of starting the vehicle 10A and set to be for example, between two and eight seconds. The time Tx may be longer as average acceleration of the vehicle 10A increases, which is an average value of time differential values of the vehicle speed V.

In a case where the predetermined time Tx has not elapsed (NO in step S28), the ECU 26 repeats step S28. In a case where the predetermined time Tx has elapsed (YES in step S28), in step S29, the ECU 26 causes the short-circuited state of the coils 50*u*, 50*v*, and 50*w* to end.

B3. Advantages in Second Embodiment

According to the second embodiment described above, the switching circuit 24, which is an electrical circuit, causes the coils 50*u*, 50*v*, and 50*w* to be short-circuited (to remain in the short-circuited state) when the vehicle 10A is started (YES in step S27 to NO in step S28 in FIG. 6). When the vehicle 10A is started, the nose 92 of the vehicle 10A typically moves upward (see FIG. 5). According to the second embodiment, since the coils 50*u*, 50*v*, and 50*w* are short-circuited when the vehicle 10A is started, it is possible to cause the oscillation damping force Fd for the displacement of the nose 92 without consuming the energy from the battery 16.

C. Third Embodiment

[C1. Configuration of Vehicle 10B (Comparison with First and Second Embodiments)]

A hardware configuration according to the third embodiment is similar to those according to the first embodiment and the second embodiment. Hereinafter, the same references are given to the same components and the detailed explanation on such components is omitted. The third embodiment is different from the first embodiment and the second embodiment in the control performed by the ECU 26.

[C2. Control in Third Embodiment]

<C2-1. Basis>

Figure 7:
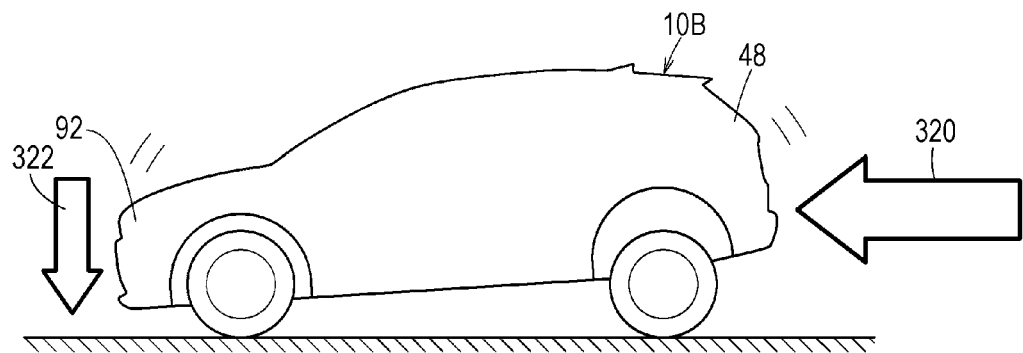
FIG. 7 illustrates how a nose of a vehicle body moves downward in decelerating a vehicle that includes an electromagnetic damper according to a third embodiment of the present application.

FIG. 7 illustrates how the nose 92 of the vehicle body 48 moves downward in decelerating a vehicle 10B that includes an electromagnetic damper 12 according to the third embodiment of the present application. In the vehicle 10B in FIG. 7, the nose 92 is displaced downward with the deceleration, and arrow 320 indicates how the vehicle 10B is decelerated while arrow 322 indicates how the nose 92 moves downward. In this manner, when the vehicle 10B is under deceleration, the nose 92 moves downward and then moves upward. Thus, it is preferable in terms of oscillation suppression that the electromagnetic damper 12 causes the oscillation damping force Fd.

In contrast, when the power supply from the battery 16 (the power source) to the motor 46 is continued even during the deceleration, the speed of decrease in the SOC of the battery 16 rises. Thus, it is preferable in terms of power consumption to stop the power supply from the battery 16 (the power source) to the motor 46 when the vehicle 10B is decelerated.

The third embodiment attempts to save power while causing the oscillation damping force Fd by short-circuiting the coils 50$u$, 50$v$, and 50$w$ when the vehicle 10B is decelerated.

<C2-2. Specific Process>

Figure 8:
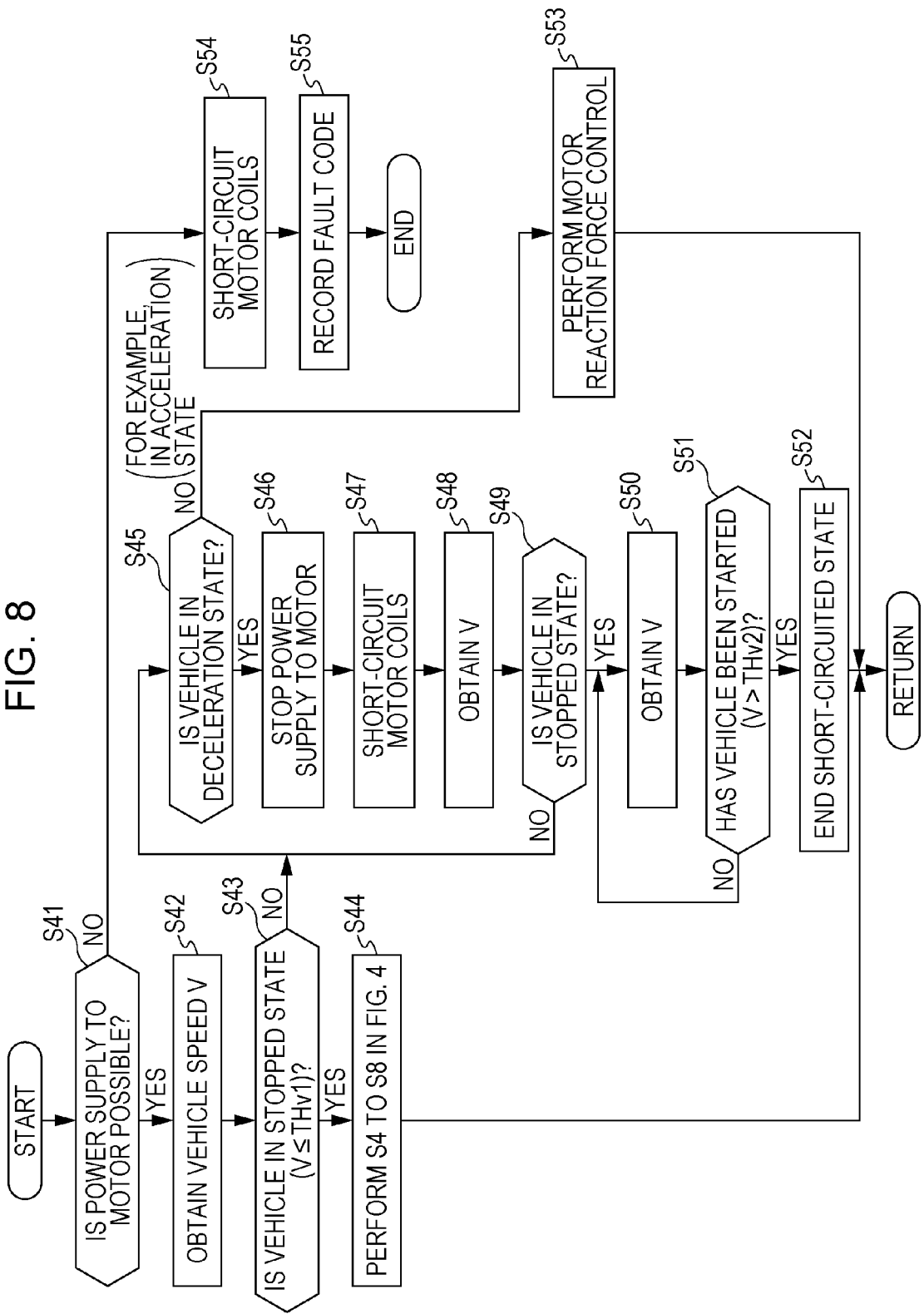
FIG. 8 is a flowchart that illustrates control of the electromagnetic damper according to the third embodiment.

FIG. 8 is a flowchart that illustrates control of the electromagnetic damper 12 according to the third embodiment. Steps S41 to S44 and steps S53 to S55 in FIG. 8 are the same as steps S1 to S8 and steps S9 to S11 in FIG. 4. As illustrated in FIG. 8, in step S44, steps S4 to S8 in FIG. 4 are performed. Thus, when compared to FIG. 4, FIG. 8 is different from FIG. 4 in that FIG. 8 includes steps S45 to S52. The control management part 80 of the ECU 26 performs steps S41 to S43, S45, and S55 in FIG. 8. The reaction force control part 82 of the ECU 26 performs step S53. The short-circuit control part 84 performs steps S44, S46 to S52, and S54.

When in step S43 in FIG. 8, the vehicle 10B is not in the stopped state (NO in step S43), the ECU 26 determines whether or not the vehicle 10B is in a predetermined deceleration state in step S45. For example, the state in which the deceleration state of the vehicle 10B, that is, the state in which the vehicle speed V indicates zero or is smaller than a predetermined value) exceeds a predetermined time threshold value THt and continues may be set as the predetermined deceleration state. The time threshold value THt may be set so that for example, the deceleration of the vehicle 10B, which is the time differential value of the vehicle speed V, is highly likely to be zero or a value near zero.

As another example, the predetermined deceleration state may be a state in which the deceleration of the vehicle 10B in absolute value is smaller than a predetermined deceleration threshold value in absolute value.

When the vehicle 10B is in the predetermined deceleration state (YES in step S45), the process proceeds to step S46. Steps S46 to S48 are the same as steps S4 to S6 in FIG. 4.

In step S49, the ECU 26 determines whether or not the vehicle 10B has entered the stopped state. The determination is similar to that in step S3 in FIG. 4. In a case where the vehicle 10B has not entered the stopped state (NO in step S49), the process returns to step S45. In a case where the vehicle 10B has entered the stopped state (YES in step S49), the process proceeds to step S50. Steps S50 to S52 are similar to steps S6 to S8 in FIG. 4.

When the process returns to step S45 and the vehicle 10B is not in the predetermined deceleration state (NO in step S45), the vehicle 10B is in the acceleration state or the like. In this case, similar to step S9 in FIG. 4, the ECU 26 performs motor reaction force control in step S53.

[C3. Advantages in Third Embodiment]

According to the third embodiment described above, the switching circuit 24, which is an electrical circuit, causes the coils 50$u$, 50$v$, and 50$w$ to be short-circuited (step S47) when the vehicle 10B is decelerated (YES in step S45 in FIG. 8). Under deceleration of the vehicle 10B, the nose 92 tends to move downward (see FIG. 7). According to the third embodiment, since the coils 50$u$, 50$v$, and 50$w$ are short-circuited when the vehicle 10B is decelerated, it is possible to cause the oscillation damping force Fd for the displacement of the nose 92 without consuming the energy from the battery 16.

When in the third embodiment, the deceleration state of the vehicle 10B exceeds the predetermined time threshold value THt and continues (YES in step S45 in FIG. 8), the ECU 26 causes the coils 50$u$, 50$v$, and 50$w$ to be short-circuited (step S47). Accordingly, it is possible to select an occasion suitable for short-circuiting the coils 50$u$, 50$v$, and 50$w$ from among times of deceleration.

D. Fourth Embodiment

[D1. Configuration of Vehicle 10C (Comparison with First Embodiment)]

Figure 9:
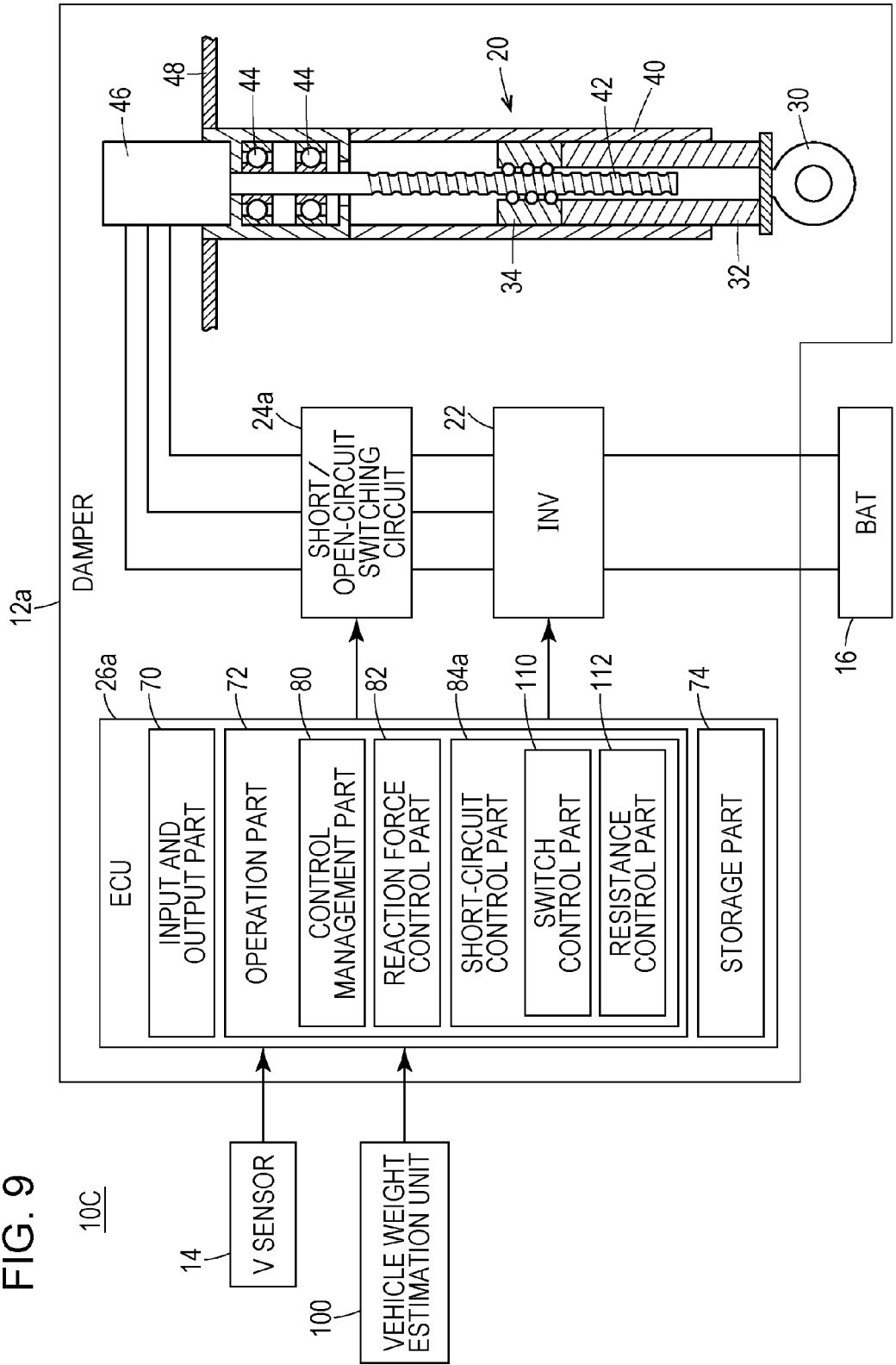
FIG. 9 is a schematic configuration diagram that simplifies and illustrates part of a vehicle including an electromagnetic damper according to a fourth embodiment of the present application.
Figure 10:
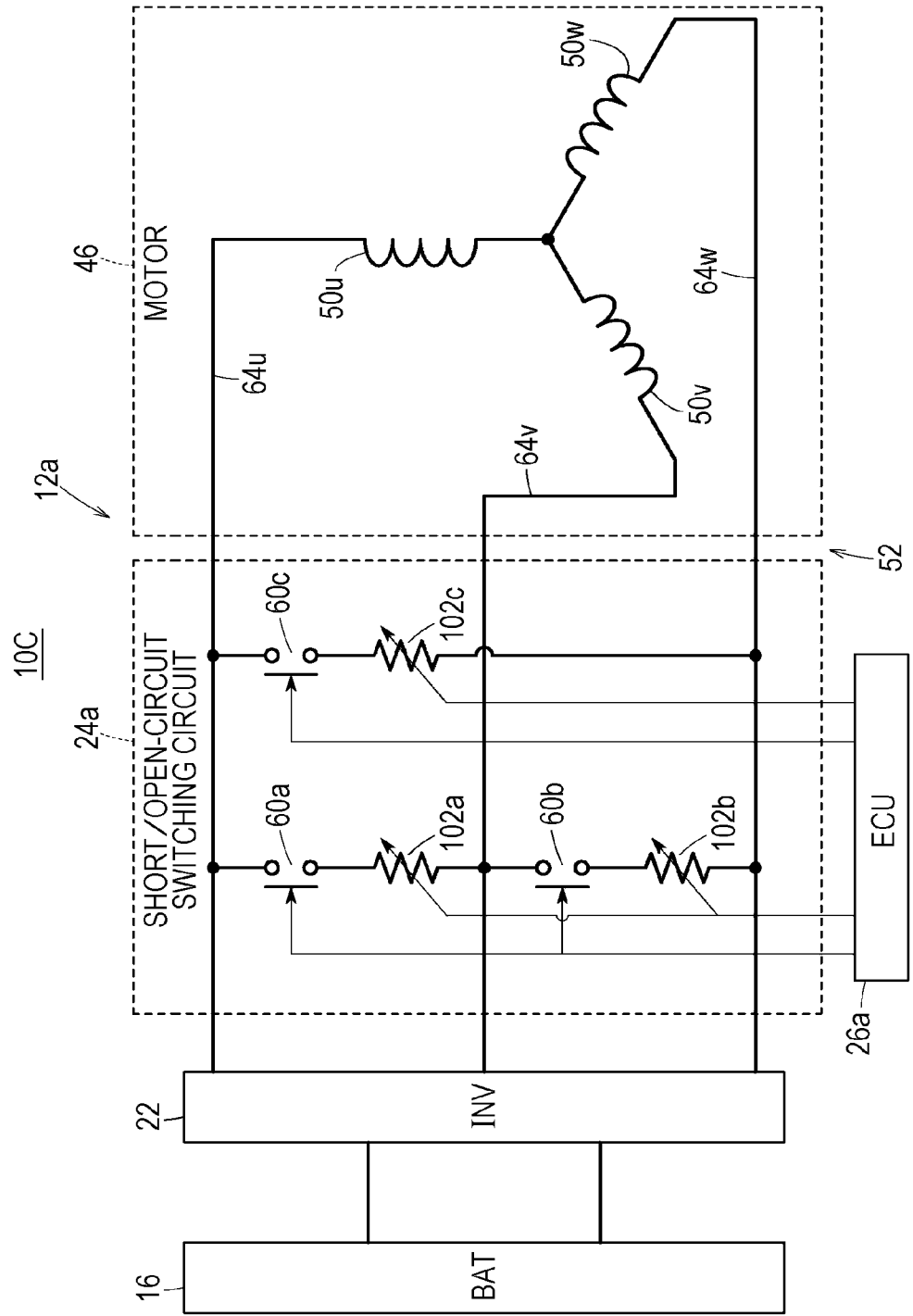
FIG. 10 is a circuit diagram that simplifies and illustrates part of the electromagnetic damper according to the fourth embodiment.

FIG. 9 is a schematic configuration diagram that simplifies and illustrates part of a vehicle 10C including an electromagnetic damper 12$a$ according to a fourth embodiment of the present application, which is also referred to as the "damper 12$a$" hereinafter. FIG. 10 is a circuit diagram that simplifies and illustrates part of the electromagnetic damper 12$a$ according to the fourth embodiment. The damper 12$a$ according to the fourth embodiment makes up part of a suspension unit of the vehicle 10C.

A hardware configuration according to the fourth embodiment is basically similar to those according to the first to third embodiments. Hereinafter, the same references are given to the same components and the detailed explanation on such components is omitted.

In addition to the damper 12$a$, the vehicle speed sensor 14, and the battery 16, the vehicle 10C includes a vehicle weight estimation unit 100, which is also referred to as the "weight estimation unit 100" hereinafter. The weight estimation unit 100 estimates a weight Ww of the entire vehicle 10C including the carried object 300 (see FIG. 3), which is also referred to as the "estimated weight Ww" hereinafter. The estimation of the weight Ww may be performed according to for example, the displacement amount of the damper 12a at the time of stopping the vehicle 10C.

A short/open-circuit switching circuit 24a according to the fourth embodiment includes variable resistors 102a to 102c (see FIG. 10) instead of the fixed resistors 62a to 62c (see FIG. 2).

A short-circuit control part 84a of an electronic control unit 26a according to the fourth embodiment, which is referred to as the "ECU 26a" hereinafter, includes a switch control part 110 and a resistance control part 112. The switch control part 110 controls switches 60a to 60c and has similar functions as those of the short-circuit control parts 84 according to the first to third embodiments. The resistance control part 112 controls resistance Rx of the variable resistors 102a to 102c.

[D2. Control in Fourth Embodiment]
<D2-1. Outline>

Figure 11:
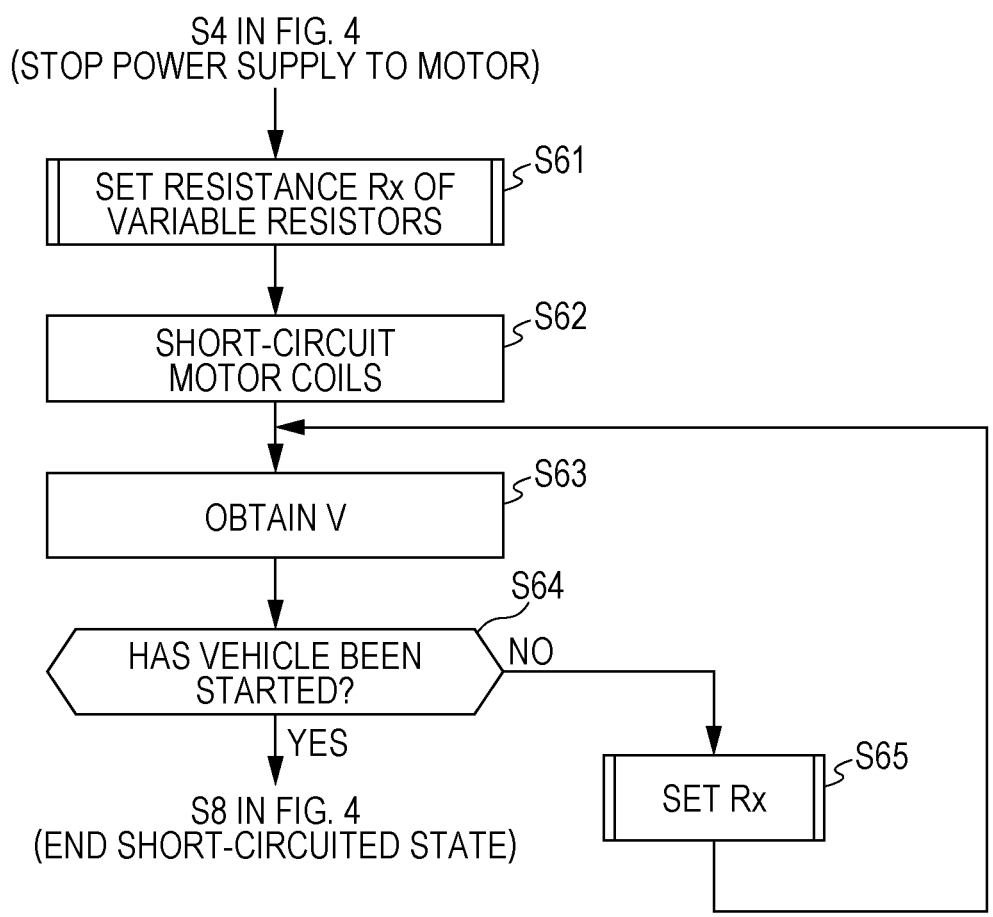
FIG. 11 is a flowchart that illustrates part of control of the electromagnetic damper according to the fourth embodiment.

FIG. 11 is a flowchart that illustrates part of control of the electromagnetic damper 12a according to the fourth embodiment. As illustrated in FIG. 11, the control of the damper 12a according to the fourth embodiment is almost the same as the control of the damper 12 according to the first embodiment (see FIG. 4) but is partially different. That is, steps S62 to S64 in FIG. 11 are similar to steps S5 to S7 in FIG. 4. When compared to FIG. 4, FIG. 11 is different from FIG. 4 in that FIG. 11 includes steps S61 and S65. The resistance control part 112 of the ECU 26a performs steps S61 and S65 in FIG. 11. The switch control part 110 performs steps S62 to S64.

After stopping the power supply from the battery 16 to the motor 46 in step S4 in FIG. 4, in step S61 in FIG. 11, the ECU 26a sets the resistance Rx of the variable resistors 102a to 102c and the setting is described in detail below with reference to FIG. 12. As described above, steps S62 to S64 are similar to steps S5 to S7 in FIG. 4.

In a case where the vehicle 10C has not been started in step S64 (NO in step S64), the ECU 26a returns to step S63 after setting or resetting the resistance Rx in step S65.

In terms of reduction in the operation load of the ECU 26a, the resistance Rx may be set only in step S61 and step S65 may be omitted.

<D2-2. Setting of Resistance Rx>
<D2-2-1. Relation between Resistance Rx and Oscillation Damping Force Fd>

Figure 12:
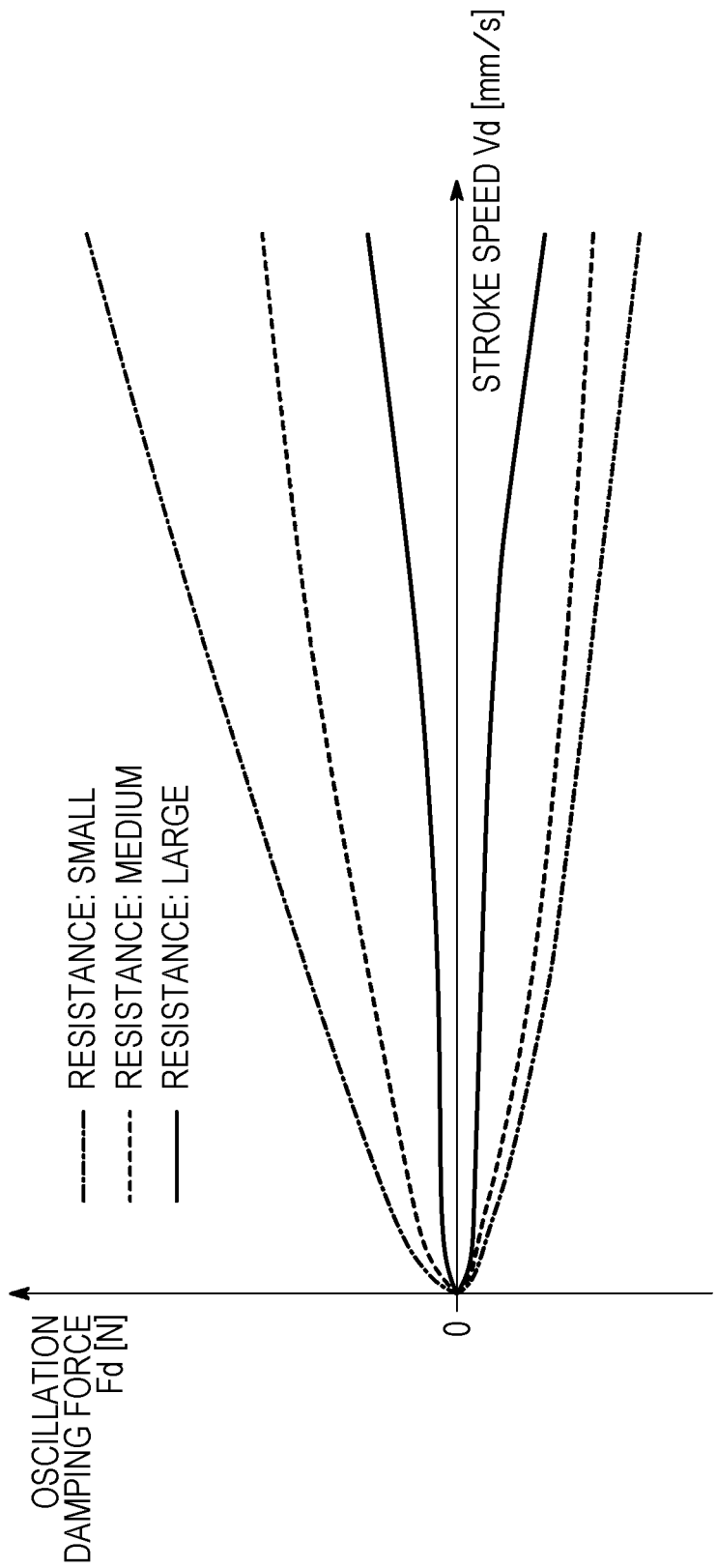
FIG. 12 illustrates an example of a relation between stroke speed and oscillation damping force of the electromagnetic damper, which depend on resistance of variable resistors.

FIG. 12 illustrates an example of a relation between stroke speed Vd and the oscillation damping force Fd of the electromagnetic damper 12a, which depend on the resistance Rx of the variable resistors 102a to 102c. As illustrated in FIG. 12, when compared in the same stroke speed Vd, the oscillation damping force Fd is larger as the resistance Rx is smaller. In the fourth embodiment, the resistance Rx is changed while taking the characteristics of FIG. 12 into account.

<D2-2-2. Specific Process of Setting of Resistance Rx>

Figure 13:
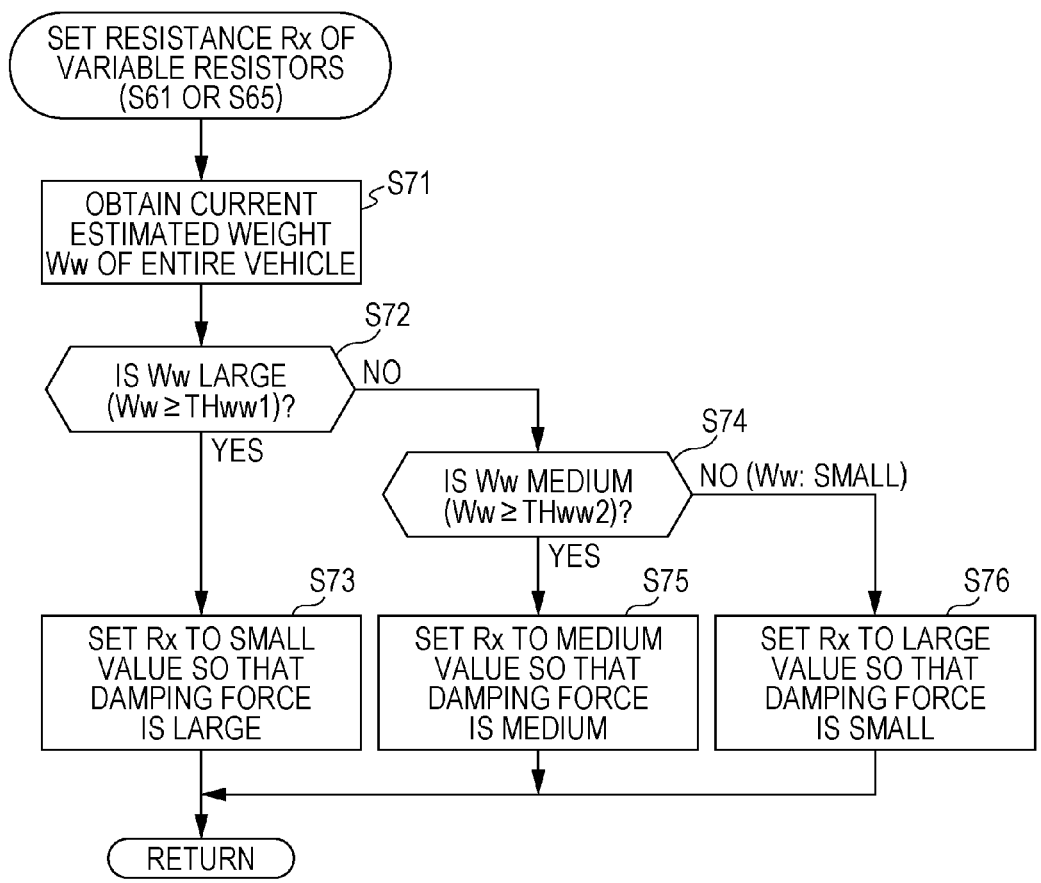
FIG. 13 is a flowchart regarding setting of the resistance of the variable resistors according to the fourth embodiment, which indicates steps S61 and S65 in FIG. 11 in detail.

FIG. 13 is a flowchart regarding the setting of the resistance Rx of the variable resistors 102a to 102c in the fourth embodiment, which indicates steps S61 and S65 in FIG. 11 in detail. In step S71, the ECU 26a obtains the current estimated weight Ww from the vehicle weight estimation unit 100. In step S72, the ECU 26a determines whether or not the estimated weight Ww is relatively large. Specifically, the ECU 26a determines whether or not the estimated weight Ww is equal to or more than a first weight threshold value THww1, which is also referred to as the "threshold value THww1" hereinafter.

When the estimated weight Ww is relatively large (YES in step S72), in step S73, the ECU 26a sets the resistance Rx of the variable resistors 102a to 102c to a relatively small value. Accordingly, the oscillation damping force Fd is relatively large (see FIG. 12).

When the estimated weight Ww is not relatively large (NO in step S72), in step S74, the ECU 26a determines whether or not the estimated weight Ww is relatively medium. Specifically, the ECU 26a determines whether or not the estimated weight Ww is equal to or more than a second weight threshold value THww2, which is also referred to as the "threshold value THww2" hereinafter.

When the estimated weight Ww is relatively medium (YES in step S74), in step S75, the ECU 26a sets the resistance Rx of the variable resistors 102a to 102c to a relatively medium value. Accordingly, the oscillation damping force Fd is relatively medium (see FIG. 12).

When the estimated weight Ww is not relatively medium (NO in step S74), the estimated weight Ww is relatively small. In this case, in step S76, the ECU 26a sets the resistance Rx of the variable resistors 102a to 102c to a relatively large value. Accordingly, the oscillation damping force Fd is relatively small (see FIG. 12).

[D3. Advantages in Fourth Embodiment]

According to the fourth embodiment described above, the electromagnetic damper 12a includes the variable resistors 102a to 102c in the closed circuit 52 caused by short-circuiting the coils 50u, 50v, and 50w (see FIG. 10). The ECU 26a switches the resistance Rx of the variable resistors 102a to 102c (see steps S61 and S65 in FIG. 11) according to the stopped state (YES in step S3 in FIG. 4) as a state of the vehicle 10C, which is related to the oscillation damping force Fd.

Accordingly, it is possible to change the oscillation damping force Fd by switching the resistance Rx of the variable resistors 102a to 102c even when the coils 50u, 50v, and 50w are short-circuited (see FIG. 12). Thus, when there is a short circuit, it is possible to generate the oscillation damping force Fd more preferably.

In the fourth embodiment, the resistance Rx is switched according to the estimated weight Ww of the entire vehicle 10C (see FIG. 13). As a result, when there is a short circuit, it is possible to generate the oscillation damping force Fd suitable for the estimated weight Ww.

E. Fifth Embodiment

[E1. Configuration of Vehicle 10D (Comparison with Fourth Embodiment)]

FIG. 14 is a schematic configuration diagram that simplifies and illustrates part of a vehicle 10D including an electromagnetic damper 12b according to a fifth embodiment of the present application, which is also referred to as the "damper 12b" hereinafter. The damper 12b according to the fifth embodiment makes up part of a suspension unit of the vehicle 10D.

A hardware configuration according to the fifth embodiment is basically similar to that according to the fourth embodiment (see FIG. 9). Hereinafter, the same references are given to the same components and the detailed explanation on such components is omitted.

In addition to the damper 12b, the vehicle speed sensor 14, and the battery 16, the vehicle 10D includes a nose displacement amount sensor 120, which is also referred to as the "displacement amount sensor 120" hereinafter. The displacement amount sensor 120 detects or estimates a displacement amount Hn [mm] in the vertical direction of the nose 92 of the vehicle body 48, which is also referred to as the "nose displacement amount Hn" hereinafter. The displacement amount Hn is deviation in the vertical direction relative to a reference height. Since there is some relation between the displacement amount Hn and the acceleration of the vehicle 10D in the back-and-forth direction, it is possible to calculate the displacement amount Hn according to the acceleration in the back-and-forth direction detected by a back-and-forth direction acceleration sensor, which is not illustrated. As another example, the displacement amount Hn may be calculated according to a distance between a lower surface of the nose 92 and a road surface by providing the lower surface of the nose 92 with an ultrasonic sensor, which is not illustrated.

[E2. Control in Fifth Embodiment]

<E2-1. Outline>

Figure 15:
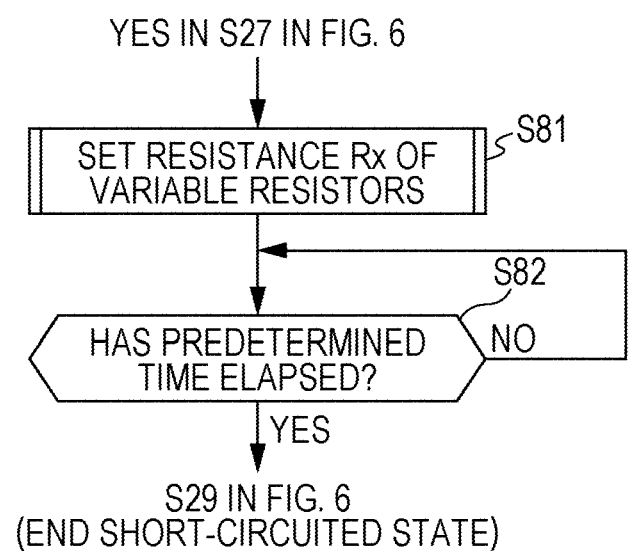
FIG. 15 is a flowchart that illustrates part of control of the electromagnetic damper according to the fifth embodiment.

FIG. 15 is a flowchart that illustrates part of control of the electromagnetic damper 12b according to the fifth embodiment. As illustrated in FIG. 15, the control of the damper 12b according to the fifth embodiment is almost the same as the control of the damper 12 according to the second embodiment (see FIG. 6) but is different in that the control of the damper 12b according to the fifth embodiment includes step S81. Step S81 is described in detail below with reference to FIG. 16.

A resistance control part 112a of an electronic control unit 26b, which is referred to as the "ECU 26b" hereinafter, performs step S81 in FIG. 15. The switch control part 110 performs step S82.

<E2-2. Setting of Resistance Rx>

Figure 16:
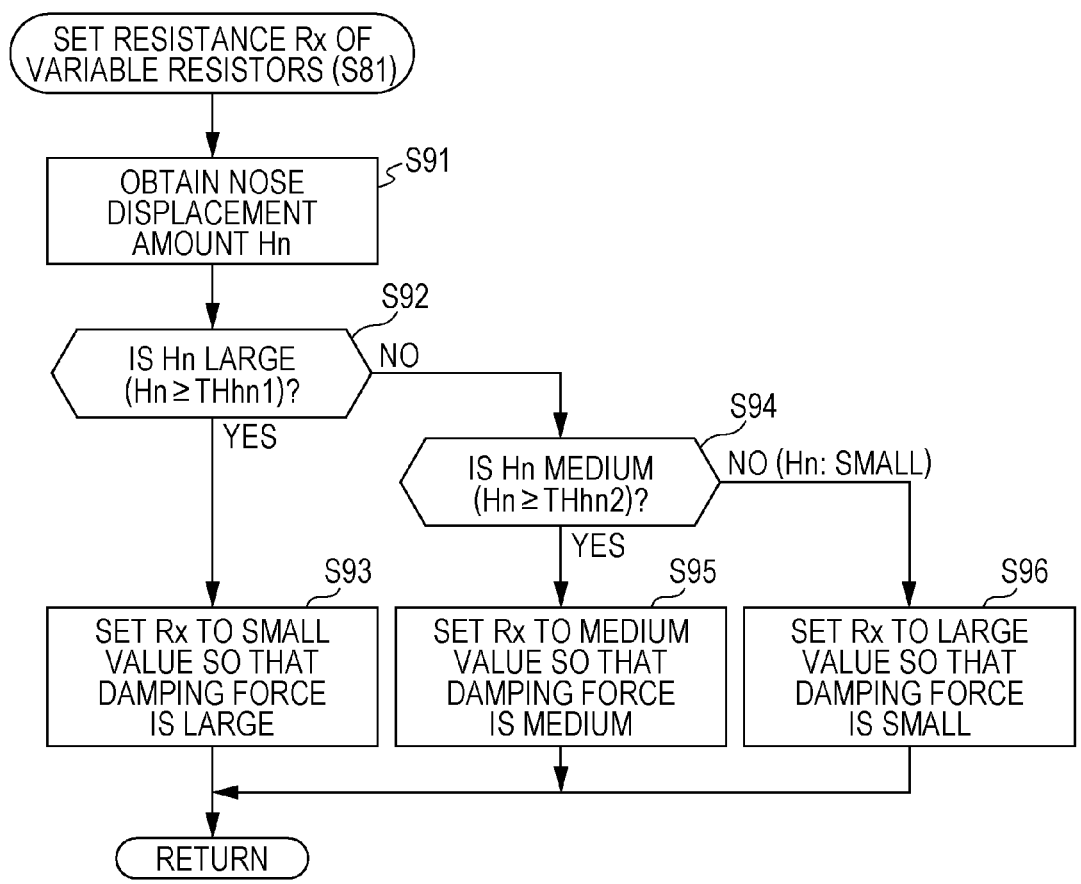
FIG. 16 is a flowchart regarding setting of resistance of variable resistors according to the fifth embodiment, which indicates step S81 in FIG. 15 in detail.

FIG. 16 is a flowchart regarding setting of the resistance Rx of the variable resistors 102a to 102c in the fifth embodiment, which indicates step S81 in FIG. 15 in detail. In step S91, the ECU 26b obtains the current nose displacement amount Hn from the displacement amount sensor 120. In step S92, the ECU 26b determines whether or not the displacement amount Hn is relatively large. Specifically, the ECU 26b determines whether or not the displacement amount Hn is equal to or more than a first displacement amount threshold value THhn1, which is also referred to as the "threshold value THhn1" hereinafter.

When the displacement amount Hn is relatively large (YES in step S92), in step S93, the ECU 26b sets the resistance Rx of the variable resistors 102a to 102c to a relatively small value. Accordingly, the oscillation damping force Fd is relatively large (see FIG. 12).

When the displacement amount Hn is not relatively large (NO in step S92), in step S94, the ECU 26b determines whether or not the displacement amount Hn is relatively medium. Specifically, the ECU 26b determines whether or not the displacement amount Hn is equal to or more than a second displacement amount threshold value THhn2, which is also referred to as the "threshold value THhn2" hereinafter.

When the displacement amount Hn is relatively medium (YES in step S94), in step S95, the ECU 26b sets the resistance Rx of the variable resistors 102a to 102c to a relatively medium value. Accordingly, the oscillation damping force Fd is relatively medium (see FIG. 12).

When the displacement amount Hn is not relatively medium (NO in step S94), the displacement amount Hn is relatively small. In this case, in step S96, the ECU 26b sets the resistance Rx of the variable resistors 102a to 102c to a relatively large value. Accordingly, the oscillation damping force Fd is relatively small (see FIG. 12).

[E3. Advantages in Fifth Embodiment]

According to the fifth embodiment described above, the electromagnetic damper 12d includes the variable resistors 102a to 102c in the closed circuit 52 caused by short-circuiting the coils 50u, 50v, and 50w (see FIG. 10). The ECU 26b switches the resistance Rx of the variable resistors 102a to 102c (see step S81 in FIG. 15), depending on the started state as a state of the vehicle 10C, which is related to the oscillation damping force Fd (YES in step S27 in FIG. 6).

Accordingly, even when the coils 50u, 50v, and 50w are short-circuited, it is possible to change the oscillation damping force Fd by switching the resistance Rx of the variable resistors 102a to 102c. Thus, when there is a short circuit, it is possible to generate the oscillation damping force Fd more preferably.

In the fifth embodiment, the resistance Rx is switched according to the displacement amount Hn of the nose 92 (see FIG. 16). As a result, when there is a short circuit, it is possible to generate the oscillation damping force Fd suitable for the displacement amount Hn.

F. Sixth Embodiment

[F1. Configuration of Vehicle 10E (Comparison with Fourth and Fifth Embodiments)]

Figure 17:
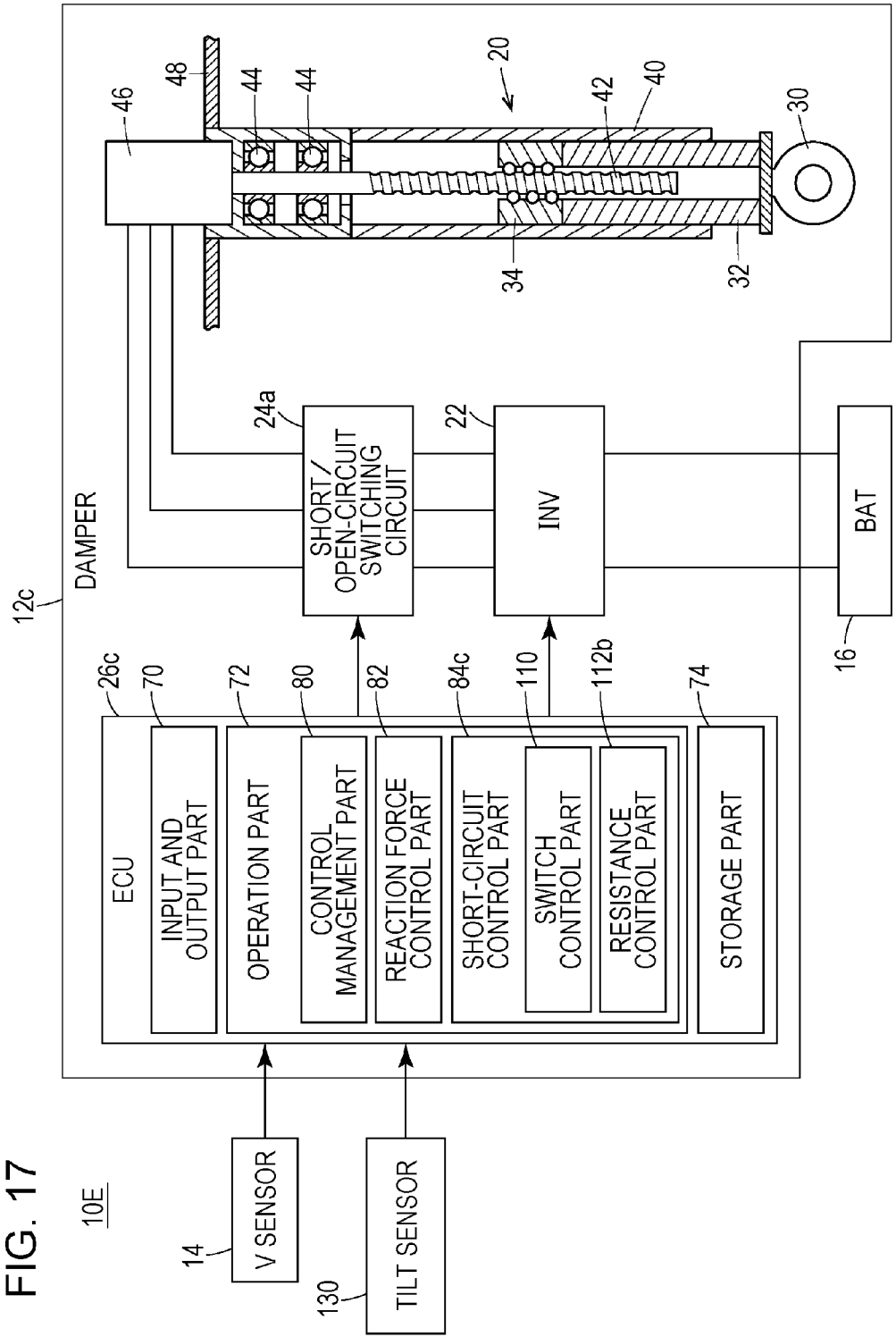
FIG. 17 is a schematic configuration diagram that simplifies and illustrates part of a vehicle including an electromagnetic damper according to a sixth embodiment of the present application.

FIG. 17 is a schematic configuration diagram that simplifies and illustrates part of a vehicle 10E including an electromagnetic damper 12c according to a sixth embodiment of the present application, which is also referred to as the "damper 12c" hereinafter. The damper 12c according to the sixth embodiment makes up part of a suspension unit of the vehicle 10E.

A hardware configuration according to the sixth embodiment is basically similar to those according to the fourth embodiment and the fifth embodiment. Hereinafter, the same references are given to the same components and the detailed explanation on such components is omitted.

In addition to the damper 12c, the vehicle speed sensor 14, and the battery 16, the vehicle 10E includes a tilt sensor 130. The tilt sensor 130 detects or estimates a tilt A [deg] in the back-and-forth direction (the pitching direction) of the vehicle 10E.

[F2. Control in Sixth Embodiment]

<F2-1. Outline>

Figure 18:
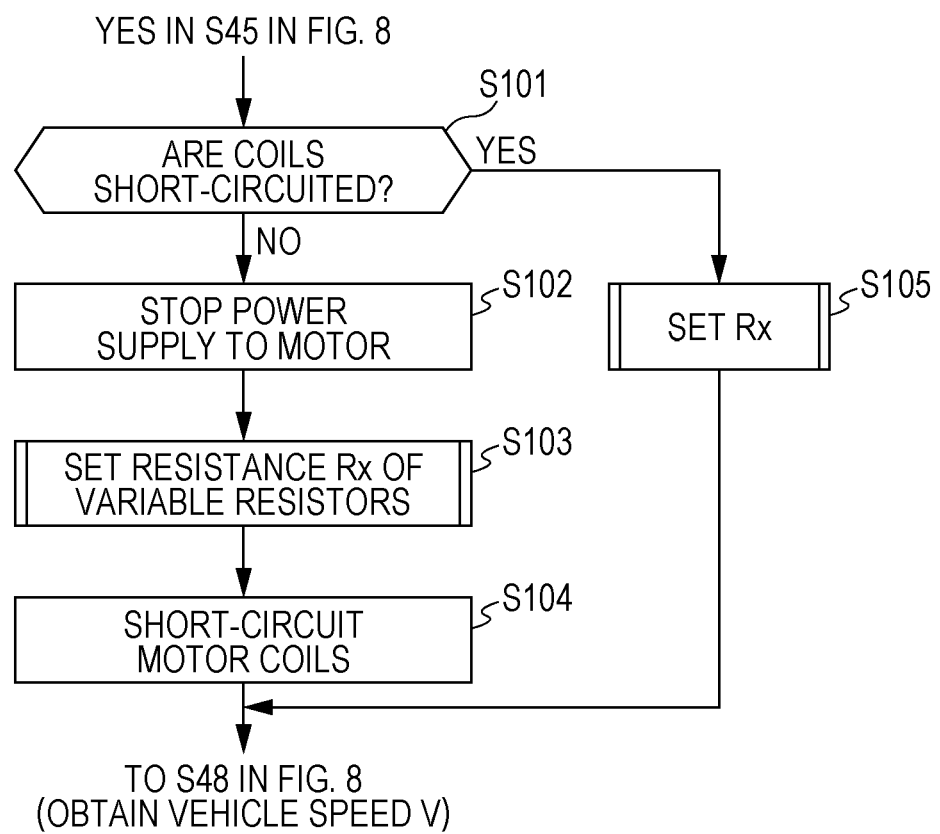
FIG. 18 is a flowchart that illustrates part of control of the electromagnetic damper according to the sixth embodiment.

FIG. 18 is a flowchart that illustrates part of control of the electromagnetic damper 12c according to the sixth embodiment. As illustrated in FIG. 18, the control of the damper 12c according to the sixth embodiment is almost the same as the control of the damper 12 according to the third embodiment (see FIG. 8) but is partially different. A resistance control part 112b of an electronic control unit 26c, which is referred to as the "ECU 26c" hereinafter, performs steps S103 and S105 in FIG. 18. The switch control part 110 performs steps S101, S102, and S104.

When the vehicle 10E is in a predetermined deceleration state in step S45 in FIG. 8 (YES in step S45), in step S101 in FIG. 18, the ECU 26c determines whether or not the coils 50u, 50v, and 50w are short-circuited. When the coils 50u, 50v, and 50w are not short-circuited (NO in step S101), in step S102, the ECU 26c stops the power supply from the battery 16 to the motor 46.

In subsequent step S103, the ECU 26c sets the resistance Rx of the variable resistors 102a to 102c. In step S104, the ECU 26c causes the coils 50u, 50v, and 50w to be short-circuited and after that, the process proceeds to step S48 in FIG. 8.

When the process returns to step S101 and the coils 50u, 50v, and 50w are short-circuited (YES in step S101), in step S105, the ECU 26c sets the resistance Rx of the variable resistors 102a to 102c.

<F2-2. Setting of Resistance Rx>

Figure 19:
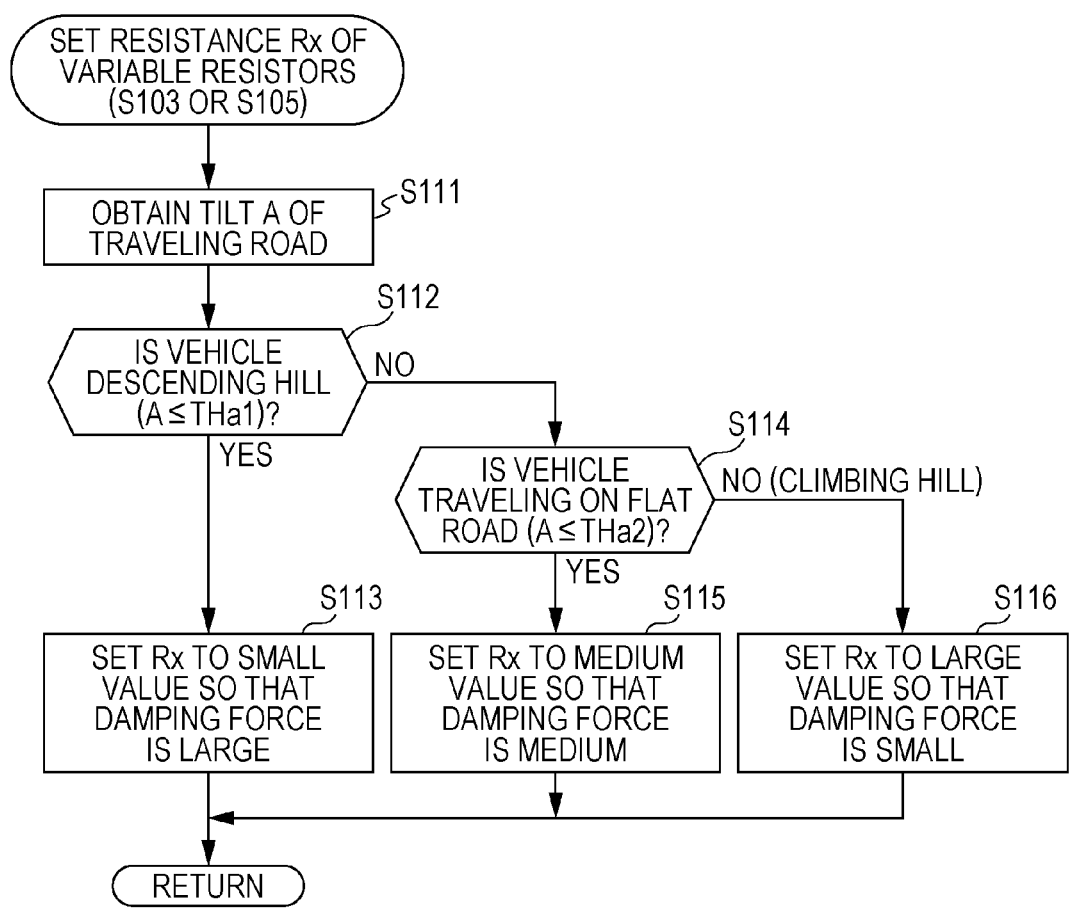
FIG. 19 is a flowchart regarding setting of resistance of variable resistors according to the sixth embodiment, which indicates steps S103 and S105 in FIG. 18 in detail.

FIG. 19 is a flowchart regarding the setting of the resistance Rx of the variable resistors 102a to 102c according to the sixth embodiment, which indicates steps S103 and S105 in FIG. 18 in detail. In step S111, the ECU 26c obtains the tilt A of a road where the vehicle 10E is currently traveling, which is referred to as the "traveling road" hereinafter, from the tilt sensor 130. In step S112, the ECU 26c determines whether or not the vehicle 10E is descending a hill. Specifically, the ECU 26c determines whether or not the tilt A is equal to or less than a first tilt threshold value THa1, which is also referred to as the "threshold value THa1" hereinafter.

When the vehicle 10E is descending a hill (YES in step S112), in step S113, the ECU 26c sets the resistance Rx of the variable resistors 102a to 102c to a relatively small value. Accordingly, the oscillation damping force Fd is relatively large (see FIG. 12).

When the vehicle 10E is not descending a hill (NO in step S112), in step S114, the ECU 26c determines whether or not the vehicle 10E is traveling on a flat road. Specifically, the ECU 26c determines whether or not the tilt A is equal to or less than a second tilt threshold value THa2, which is also referred to as the "threshold value THa2" hereinafter.

When the vehicle 10E is traveling on a flat road (YES in step S114), step S115, the ECU 26c sets the resistance Rx of the variable resistors 102a to 102c to a relatively medium value. Accordingly, the oscillation damping force Fd is relatively medium (see FIG. 12).

When the vehicle 10E is not traveling on a flat road (NO in step S114), it is thinkable that the vehicle 10E is climbing a hill. In this case, in step S116, the ECU 26c sets the resistance Rx to a relatively large value. Accordingly, the oscillation damping force Fd is relatively small (see FIG. 12).

[F3. Advantages in Sixth Embodiment]

According to the sixth embodiment, the electromagnetic damper 12c includes the variable resistors 102a to 102c in the closed circuit 52 caused by short-circuiting the coils 50u, 50v, and 50w (see FIG. 10). The ECU 26c switches the resistance Rx of the variable resistors 102a to 102c (see steps S103 and S105 in FIG. 18), depending on the deceleration state (YES in step S45 in FIG. 8) as a state of the vehicle 10E, which is related to the oscillation damping force Fd.

Accordingly, even when the coils 50u, 50v, and 50w are short-circuited, it is possible to change the oscillation damping force Fd by switching the resistance Rx of the variable resistors 102a to 102c. Thus, when there is a short circuit, it is possible to generate the oscillation damping force Fd more preferably.

In the sixth embodiment, the resistance Rx is switched according to the tilt A of the traveling road (see FIG. 19). As a result, when there is a short circuit, it is possible to generate the oscillation damping force Fd suitable for the tilt A.

G. Variations

The present application is not limited to the above-described embodiments and may employ various configurations based on the contents described herein as a matter of course. For example, the configurations described below may be employed.

[G1. Application Targets]

In the embodiments above describe examples in which the electromagnetic dampers 12, and 12a to 12c are applied to the vehicles 10, and 10A to 10E. For example, when an oscillation damping function accompanied by short-circuiting the coils 50u, 50v, and 50w is noted, the applicability is not limited thereto. For example, the electromagnetic dampers 12, and 12a to 12c are applicable to other kinds of equipment, including manufacture equipment, an escalator, and an elevator, which need the oscillation damping performance.

[G2. Electromagnetic Dampers 12, and 12a to 12c]

<G2-1. Damper Main Body 20>

In each of the above-described embodiments, the damper main body 20 according to the configuration illustrated in FIG. 1 or the like is used (see FIGS. 1, 9, 14, and 17). When for example, the oscillation damping function accompanied by short-circuiting the coils 50u, 50v, and 50w is noted, the applicability is not limited thereto. Examples of another applicable configuration include an electromagnetic hydraulic hybrid type, a ball screw type, a rack and pinion type, and a direct type (a linear motor) only when the configuration involves an actuator that uses the motor 46, which is an electromagnetic motor.

<G2-2. Short/Open-Circuit Switching Circuits 24 and 24a>

In each of the above-described embodiments, the switching circuits 24 and 24a are arranged between the inverter 22 and the motor 46 (see FIGS. 1, 9, 14, and 17). For example, in terms of short-circuiting the coils 50u, 50v, and 50w, the applicability is not limited thereto. For example, the switching circuits 24 and 24a may be provided in the inverter 22. As another example, the switching circuits 24 and 24a may be provided between the battery 16 and the inverter 22.

<G2-3. Motor 46>

Although in each of the above-described embodiments, a three-phase AC brushless motor is used as the motor 46, when for example, the oscillation damping function accompanied by short-circuiting the coils 50u, 50v, and 50w is noted, the applicability is not limited thereto. For example, the motor 46 may be a three-phase AC brush-equipped motor. As another example, the motor 46 may be a DC motor.

<G2-4. Variable Resistors 102a to 102c (Load)>

In the fourth to sixth embodiments, the oscillation damping force Fd is made variable by switching the resistance Rx of the variable resistors 102a to 102c (see steps S61 and S65 in FIG. 11, step S81 in FIG. 15, and steps S103 and S105 in FIG. 18). For example, in terms of changing the damping force Fd in short-circuiting the coils 50u, 50v, and 50w, the applicability is not limited thereto. It is also possible to change the damping force Fd by for example, switching the magnitude of load other than the variable resistors 102a to 102c, such as an air conditioner.

G3. Control

In each of the above-described embodiments, the ECUs 26, and 26a to 26c control the switching circuits 24 and 24a (FIGS. 1, 9, 14, and 17). In terms of providing a switch control unit that causes the coils 50u, 50v, and 50w to be short-circuited in the state where for example, the power (energy) from the battery 16 to the motor 46 is interrupted, the applicability is not limited thereto. For example, it is also possible to cause a power line that connects the battery 16 and the inverter 22 to branch for input to a comparator and turn on or off the switches 60a to 60c, depending on the input of the comparator.

The first embodiment or the like employs a case where the vehicle speed V is equal to or less than a threshold value as the stopped state (see step S3 in FIG. 4 for example). When for example, the oscillation damping force Fd in getting on or off of an occupant or in loading or unloading the vehicle is noted, the applicability is not limited thereto. For example, it is also possible to set it as a criterion for the stopped state that an ignition switch (IGSW) is turned off or present at the position of an accessory. As another example, it may be set as a criterion for the stopped state that respective doors of the vehicle 10, and 10A to 10E are opened.

In the second embodiment (see FIG. 6) and the fifth embodiment (see FIGS. 6 and 15), the coils 50u, 50v, and 50w are caused to remain short-circuited until predetermined time has elapsed after starting the vehicle after the vehicle 10A or 10D had entered the stopped state (YES in step S23 in FIG. 6 to NO in step S28, and see steps S81 and S82 in FIG. 15). When for example, the short circuits in starting the vehicle is noted, it is also possible to short-circuit the coils 50u, 50v, and 50w after starting the vehicle (YES in step S27 in FIG. 6).

The third embodiment (see FIG. 8) and the sixth embodiment (see FIGS. 8 and 18) each describe a case where when the deceleration state of the vehicle 10B or 10E exceeds the predetermined time threshold value THt and continues (YES in step S45 in FIG. 8), the coils 50u, 50v, and 50w are short-circuited (see step S47 in FIG. 8 and step S104 in FIG. 18).

For example, in terms of selecting an occasion suitable for short-circuiting the coils 50u, 50v, and 50w from among times of deceleration, the applicability is not limited thereto. For example, when the vehicle speed V is in a state where the vehicle speed V falls below a predetermined vehicle speed threshold value THvx, the coils 50u, 50v, and 50w may be short-circuited. When for example, it is assumed that the vehicle 10B or 10E is traveling on a flat paved road at the vehicle speed V the same as the threshold value THvx, the vehicle speed threshold value THvx used here may be a value that is likely to sufficiently exert damping characteristics even with the oscillation damping force Fd caused through the short circuits.

As another example, when the absolute value of the deceleration of the vehicle 10B or 10E is larger than zero and falls below a predetermined deceleration threshold value, the coils 50u, 50v, and 50w may be short-circuited.

In the fourth embodiment (see FIGS. 4, 11, and 13), the oscillation damping force Fd is changed according to the estimated weight Ww (FIG. 13) on the basis that the vehicle 10C is in the stopped state (YES in step S3 in FIG. 4). For example, in terms of changing the oscillation damping force Fd according to the estimated weight Ww, the oscillation damping force Fd may be changed by the process illustrated in FIG. 13 in a case other than the stopped state, such as in starting or decelerating the vehicle.

In the fifth embodiment (see FIGS. 6, 15, and 16), the oscillation damping force Fd is changed according to the displacement amount Hn of the nose 92 (see FIGS. 15 and 16) until the predetermined time Tx elapses after starting the vehicle 10D. For example, in terms of changing the oscillation damping force Fd according to the displacement amount Hn, the oscillation damping force Fd may be changed by the process illustrated in FIG. 16 also in other cases, such as in stopping or decelerating the vehicle.

In the sixth embodiment (see FIGS. 8, 18, and 19), the oscillation damping force Fd is changed according to the tilt A of the traveling road (see FIG. 19) on the basis that the vehicle 10E is in the predetermined deceleration state (YES in step S45 in FIG. 8). For example, in terms of changing the oscillation damping force Fd according to the tilt A, the oscillation damping force Fd may be changed by the process illustrated in FIG. 19 also in other cases, such as in stopping or starting the vehicle.

What is claimed is:

1. An electromagnetic damper attached to a vehicle, comprising:
    a motor having a coil electrically connected to a power source that supplies a power to the motor, the motor being configured to generate oscillation damping force;
    a vehicle speed sensor configured to detect a speed of the vehicle;
    a controller provided with a switching element configured to stop a power supply from the power source to the motor and to restart the power supply in a controlled manner in accordance with the speed of the vehicle detected by the vehicle speed sensor; and
    an electrical circuit that causes the coil of the motor to be short-circuited to form a closed circuit including the coil therein,
    wherein the controller is configured to control the electrical circuit to short-circuit the coil of the motor in a state where the power supply is stopped and to cause the short-circuited state to end in a state where the power supply is restarted.

2. The electromagnetic damper according to claim 1, wherein
    the electrical circuit causes the coil to be short-circuited when the vehicle is started.

3. The electromagnetic damper according to claim 1, wherein
    the electrical circuit causes the coil to be short-circuited when the vehicle is decelerated.

4. The electromagnetic damper according to claim 3, wherein
    the electrical circuit causes the coil to be short-circuited (i) when the vehicle continues to be decelerated for a period of time exceeding a predetermined time threshold value, (ii) when the vehicle is decelerated in a state where a vehicle speed is below a predetermined vehicle speed threshold value, or (iii) when deceleration of the vehicle defined as a time differential value of the vehicle speed is larger than zero and falls below a predetermined deceleration threshold value.

5. The electromagnetic damper according to claim 1, further comprising:
    a variable resistor provided in the closed circuit, wherein resistance of the variable resistor is switched according to a state of the vehicle, the state of the vehicle being related to the oscillation damping force.

6. The electromagnetic damper according to claim 1, further comprising:
    providing a variable resistor in a closed circuit formed by short-circuiting the coil of the motor; and
    switching resistance of the variable resistor according to a state of the vehicle, the state of the vehicle being related to the oscillation damping force.

7. A method for controlling an electromagnetic damper attached to a vehicle, comprising:
    supplying a power from a power source to a coil of a motor configured to apply oscillation damping force to the damper;
    detecting a vehicle speed;
    stopping a power supply from the power source to the coil of the motor and restarting the power supply in a controlled manner in accordance with the detected vehicle speed; and short-circuiting the coil of the motor when the power supply is stopped and causing the short-circuited state to end in a state where the power supply is restarted.

8. The method according to claim 7, wherein
the supply of the power to the motor is stopped and the coil of the motor is short-circuited when the vehicle is started.

9. The method according to claim 7, wherein
the supply of the power to the motor is stopped and the coil of the motor is short-circuited when the vehicle is decelerated.

10. The method according to claim 9, wherein the coil of the motor is short-circuited (i) when the vehicle continues to be decelerated for a period of time exceeding a predetermined time threshold value, (ii) the vehicle is decelerated in a state where a vehicle speed is below a predetermined vehicle speed threshold value, or (iii) when deceleration of the vehicle defined as a time differential value of the vehicle speed is larger than zero and falls below a predetermined deceleration threshold value.

* * * * *